(12) United States Patent
Ho et al.

(10) Patent No.: US 11,535,364 B2
(45) Date of Patent: Dec. 27, 2022

(54) PROCESS AND MACHINE FOR LOAD ALLEVIATION

(71) Applicant: The Boeing Company, Chicago, IL (US)

(72) Inventors: Alexander C. Ho, Seattle, WA (US); Uy-Loi Ly, Seattle, WA (US); Aaron M. Niemiec, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 327 days.

(21) Appl. No.: 16/715,850

(22) Filed: Dec. 16, 2019

(65) Prior Publication Data

US 2021/0179259 A1 Jun. 17, 2021

(51) Int. Cl.
| | |
|---|---|
| *B64C 13/16* | (2006.01) |
| *G05D 1/00* | (2006.01) |
| *B64C 13/50* | (2006.01) |
| *G05D 1/02* | (2020.01) |
| *G05D 1/06* | (2006.01) |
| *B64C 9/16* | (2006.01) |
| *G05D 1/08* | (2006.01) |

(52) U.S. Cl.
CPC .......... *B64C 13/16* (2013.01); *G05D 1/0066* (2013.01); *B64C 9/16* (2013.01); *B64C 13/503* (2013.01); *B64C 2230/04* (2013.01); *B64C 2230/06* (2013.01); *G05D 1/0204* (2013.01); *G05D 1/0623* (2013.01); *G05D 1/0816* (2013.01)

(58) Field of Classification Search
CPC . B64C 13/16; B64C 13/18; B64D 2045/0085; B64D 43/02; G05D 1/0066; G05D 1/0204; G05D 1/0623; G05D 1/0816
See application file for complete search history.

(56) References Cited

U.S. PATENT DOCUMENTS

| | | | | |
|---|---|---|---|---|
| 5,135,186 | A * | 8/1992 | Ako | ........................ B64C 13/16 244/78.1 |
| 8,000,847 | B2 * | 8/2011 | Shue | ..................... G05D 1/0623 356/450 |
| 8,333,348 | B1 | 12/2012 | Miller | |
| 8,774,987 | B2 | 7/2014 | Walton et al. | |
| 8,788,122 | B1 | 7/2014 | Sankrithi et al. | |
| 9,488,544 | B2 * | 11/2016 | Long | ..................... B64D 45/00 |

(Continued)

*Primary Examiner* — Richard R. Green
*Assistant Examiner* — Madison Elizabeth Dittner
(74) *Attorney, Agent, or Firm* — Yee & Associates, P.C.

(57) ABSTRACT

A process and machine configured to predict and preempt an undesired load and/or bending moment on a part of a vehicle resulting from an exogenous or a control input. The machine may include a predictor with an algorithm for converting parameters from a state sensed upwind from the part into an estimated normal load on the part and a prediction, for a future time, of a normal load scaled for a weight of the aerospace vehicle. The machine may: produce, using a state upwind from the part on the aerospace vehicle and/or a maneuver input, a predicted state, load and bending moment on the part at a time in the future; derive a command preempting the part from experiencing the predicted load and bending moment; and actuate the command just prior to the part experiencing the predicted state, thereby alleviating the part from experiencing the predicted load and bending moment.

20 Claims, 11 Drawing Sheets

(56) References Cited

U.S. PATENT DOCUMENTS

| | | | |
|---|---|---|---|
| 9,639,089 B2 | 5/2017 | Abdel-Motagaly et al. | |
| 2004/0079835 A1* | 4/2004 | Volk | B64C 9/22 |
| | | | 244/76 C |
| 2007/0114327 A1 | 5/2007 | Dees et al. | |
| 2021/0319705 A1* | 10/2021 | Furumoto | G08G 5/0091 |

* cited by examiner

PROCESS AND MACHINE FOR LOAD ALLEVIATION

BACKGROUND INFORMATION

1. Field

The present disclosure relates generally to controlling a load on a structure. More particularly, the disclosure relates to controlling a load on an aerospace vehicle.

2. Background

A state of an aerospace vehicle may be influenced by inputs that may lead to an undesired state for the aerospace vehicle. A future state of the aerospace vehicle may be influenced by exogenous affects or by inputs to and displacements of control elements of a flight control system for the aerospace vehicle. Inputs to flight control elements of an aerospace vehicle intend to place the aerospace vehicle in a desired state. The future state may be established and/or influenced by inertia established by inputs to the control elements intended for the aerospace vehicle to perform a particular maneuver, as well as by exogenous influences on the aerospace vehicle.

SUMMARY

In one illustrative example, a machine is shown configured to provide an innovative technical solution that alleviates a load on an aerospace vehicle. The machine may include: a sensor; a control element on the aerospace vehicle configured to change the load on a part of the aerospace vehicle; a predictor that may include a program code that may include an algorithm that may include rules configured to convert parameters from a state sensed, upwind from the part on the aerospace vehicle, into an estimated $N_z$ load on the part and a prediction, for a future time, of an $N_z$ load scaled for a weight of the aerospace vehicle. The state sensed upwind from the part may be a wind gust affecting the aerospace vehicle. The control element may include one of: an inboard spoiler, an outboard spoiler, and elevator, an aileron, or a combination thereof.

The machine of the illustrative example may also include the predictor configured to communicate the prediction of the $N_z$ load to a load alleviation processor that may include an alleviation program code that may include an alleviation algorithm that may include rules configured to, based upon the prediction of the $N_z$ load, generate and issue an alleviation command to the control element of the aerospace vehicle that may alleviate the load on the part. The predictor may also be configured to: decrease, compared to a load alleviation sub-system that includes at least one of a notch filter and a non-linear filter, a time required for generating and executing an alleviation command; and eliminate a susceptibility to instability from the load alleviation sub-system of the aerospace vehicle.

The machine of the illustrative example may also include the predictor configured to receive an input for a desired maneuver for the aerospace vehicle and, based upon the input, derive a predicted $N_z$ load on a part of aerospace vehicle at a time in the future. The machine may also include a load alleviation sub-system configured to: based upon the prediction of the $N_z$ load, derive a predicted bending moment about a location on the aerospace vehicle; and derive and execute, before a time in the future, an alleviation command that alleviates the predicted bending moment.

In yet another illustrative example, a process provides an innovative technical solution for alleviating a load on a part of an aerospace vehicle. The process of the illustrative example may include: predicting, using a state upwind from the part on the aerospace vehicle, a predicted state of and a predicted load on the part at a time in the future; deriving an alleviation command for a control element of the aerospace vehicle for preempting the part from experiencing the predicted load due to the predicted state; and actuating the alleviation command at the control element just prior to the part experiencing the predicted state, thereby alleviating the part from experiencing the predicted load. The state upwind from the part on the aerospace vehicle may include at least one of: an exogenous environmental influence affecting the aerospace vehicle, or a parameter sensed by a sensor located upwind from the part on the aerospace vehicle. The predicted state and the predicted load may be based upon a wind gust sensed upwind from the part. An estimate of a gust experienced upwind from the part may be used for predicting a value for an $N_z$ load on a wing of the aerospace vehicle when the gust reaches the wing.

The process of the illustrative example also provides an innovative technical solution for decreasing, compared to a load alleviation system comprising at least one of a notch filter and a non-linear filter, a time period required for generating and executing the alleviation command; and eliminating a susceptibility to instability in a load alleviation sub-system of the aerospace vehicle. Predicting a value for an $N_z$ load on a wing of the aerospace vehicle by an $N_z$ predictor may include receiving an input that may include a desired maneuver for the aerospace vehicle.

The process of the illustrative example may also include the $N_z$ predictor using the input for determining the predicted load for the part, and deriving, using the predicted load on the part, a predicted bending moment, at a future time, about a location on the aerospace vehicle. The process of the illustrative example may also include deriving and executing the alleviation command for alleviating the predicted bending moment.

In yet another illustrative example, a process may provide an innovative technical solution for deriving and alleviating a predicted $N_z$ load at a location on a wing of an aerospace vehicle. The process of the illustrative example may include: sensing an input affecting a first part of the aerospace vehicle at a time prior to the input affecting the wing; deriving, in an $N_z$ predictor using the input, an NZ load estimate and the predicted $N_z$ load at the location at a time in the future; preempting the predicted $N_z$ load at the location at the time in the future via deriving an alleviation command for a load alleviation sub-system; and sending the alleviation command to a control element of the aerospace vehicle. The input may be a wind gust impacting the aerospace vehicle. The input may be a desired maneuver for the aerospace vehicle.

The process of the illustrative example may also include the $N_z$ predictor: decreasing, compared to a load alleviation sub-system comprising at least one of a notch filter and a non-linear filter, a time required for generating and executing the alleviation command; and eliminating a susceptibility to instability in the load alleviation sub-system of the aerospace vehicle. The process of the illustrative example may also include deriving, using the predicted $N_z$ load, a predicted bending moment about a root of the wing; and deriving and executing, before the time in the future, the alleviation command for alleviating the predicted bending moment.

The features and functions can be achieved independently in various examples of the present disclosure or may be combined in yet other examples in which further details can be seen with reference to the following description and drawings. One of ordinary skill in the art understands that examples given relative to a pitch axis and $N_z$ loads may be equivalently applied to other axes, and to other vehicles that experience a flow of fluid across their structure.

Clause 1: A process comprising predicting, using a state upwind from a part on a vehicle, a predicted state of and a predicted load on the part at a time in the future; deriving an alleviation command for a control element of the vehicle for preempting the part from experiencing the predicted load due to the predicted state; and actuating the alleviation command at the control element just prior to the part experiencing the predicted state, thereby alleviating the part from experiencing the predicted load.

Clause 2: The process of Clause 1, wherein the vehicle is an aerospace vehicle.

Clause 3: The process of Clause 1 or 2, wherein the state upwind comprises at least one of: an exogenous environmental influence affecting the aerospace vehicle, or a parameter sensed by a sensor located upwind from the part on the vehicle.

Clause 4: The process of any of Clauses 1-3, further comprising deriving the predicted state and the predicted load based upon a wind gust sensed upwind from the part.

Clause 5: The process of any of Clauses 1-4, further comprising using an estimate of a wind gust experienced upwind from the part for predicting a value for an $N_z$ load on a wing of the vehicle when the wind gust reaches the wing.

Clause 6: The process of any of Clauses 1-5, further comprising decreasing, compared to a load alleviation system comprising at least one of a notch filter and a non-linear filter, a time period required for generating and executing the alleviation command; and eliminating a susceptibility to instability in a load alleviation sub-system of the vehicle.

Clause 7: The process of any of Clauses 1-6, further comprising performing the predicting by an $N_z$ predictor receiving an input comprising a desired maneuver for the vehicle.

Clause 8: The process of Clause 7, further comprising the $N_z$ predictor using the input for determining the predicted load for the part, and deriving, using the predicted load on the part, a predicted bending moment, at a future time, about a location on the vehicle.

Clause 9: The process of Clause 8, further comprising deriving and executing the alleviation command for alleviating the predicted bending moment.

Clause 10: A process comprising sensing an input affecting a first part of an aerospace vehicle at a time prior to the input affecting a wing of the aerospace vehicle; deriving, in an $N_z$ predictor using the input, an $N_z$ load estimate and a predicted $N_z$ load at a location on the wing at a time in the future; preempting the predicted $N_z$ load at the location at the time in the future via deriving an alleviation command for a load alleviation sub-system; and sending the alleviation command to a control element of the aerospace vehicle.

Clause 11: The process of Clause 10, further comprising the $N_z$ predictor decreasing, compared to a load alleviation sub-system comprising at least one of a notch filter and a non-linear filter, a time required for generating and executing the alleviation command; and eliminating a susceptibility to instability in the load alleviation sub-system of the aerospace vehicle.

Clause 12: The process of Clause 10 or 11, further comprising the input being a wind gust impacting the aerospace vehicle.

Clause 13: The process of any of Clauses 10-12, further comprising the input being a desired maneuver for the aerospace vehicle.

Clause 14: The process of any of Clauses 10-13, further comprising deriving, using the predicted $N_z$ load, a predicted bending moment about a root of the wing; and deriving and executing, before the time in the future, the alleviation command for alleviating the predicted bending moment.

Clause 15: A machine configured to alleviate a load on an aerospace vehicle, the machine comprising a sensor; a control element on the aerospace vehicle configured to change the load on a part of the aerospace vehicle; and a predictor that comprises a program code that comprises an algorithm that comprises rules configured to convert parameters from a state sensed upwind from the part on the aerospace vehicle into an estimated $N_z$ load on the part and a prediction, for a time in the future, of an $N_z$ load scaled for a weight of the aerospace vehicle.

Clause 16: The machine of Clause 15, further comprising the predictor configured to communicate the prediction of the $N_z$ load scaled for the weight of the aerospace vehicle to a load alleviation processor that comprises an alleviation program code that comprises an alleviation algorithm that comprises rules configured to, based upon the prediction of the $N_z$ load scaled for the weight of the aerospace vehicle, generate and issue an alleviation command to the control element of the aerospace vehicle that alleviates the load on the part Clause 17: The machine of Clause 15 or 16, further comprising the state sensed upwind from the part being a wind gust affecting the aerospace vehicle.

Clause 18: The machine of any of Clauses 15-17, further comprising the control element comprising one of: an inboard spoiler, an outboard spoiler, an elevator, an aileron, or a combination thereof.

Clause 19: The machine of any of Clauses 15-18, further comprising the predictor configured to decrease, compared to a load alleviation sub-system that comprises at least one of a notch filter and a non-linear filter, a time required for generating and executing an alleviation command; and eliminate a susceptibility to instability from the load alleviation sub-system of the aerospace vehicle.

Clause 20: The machine of any of Clauses 15-19, further comprising the predictor configured to receive an input for a desired maneuver for the aerospace vehicle and, based upon the input, derive a predicted $N_z$ load on the part of the aerospace vehicle at the time in the future.

Clause 21: The machine of any of Clauses 15-20, further comprising a load alleviation sub-system configured to, based on upon the prediction of the NZ load scaled for the weight of the aerospace vehicle, derive a predicted bending moment about a location on the aerospace vehicle; and derive and execute, before the time in the future, an alleviation command that alleviates the predicted bending moment.

BRIEF DESCRIPTION OF THE DRAWINGS

The illustrative examples, as well as a preferred mode of use, further objectives and features thereof, will best be understood by reference to the following detailed description of an illustrative example of the present disclosure when read in conjunction with the accompanying drawings, wherein.

DETAILED DESCRIPTION

Figure 1:
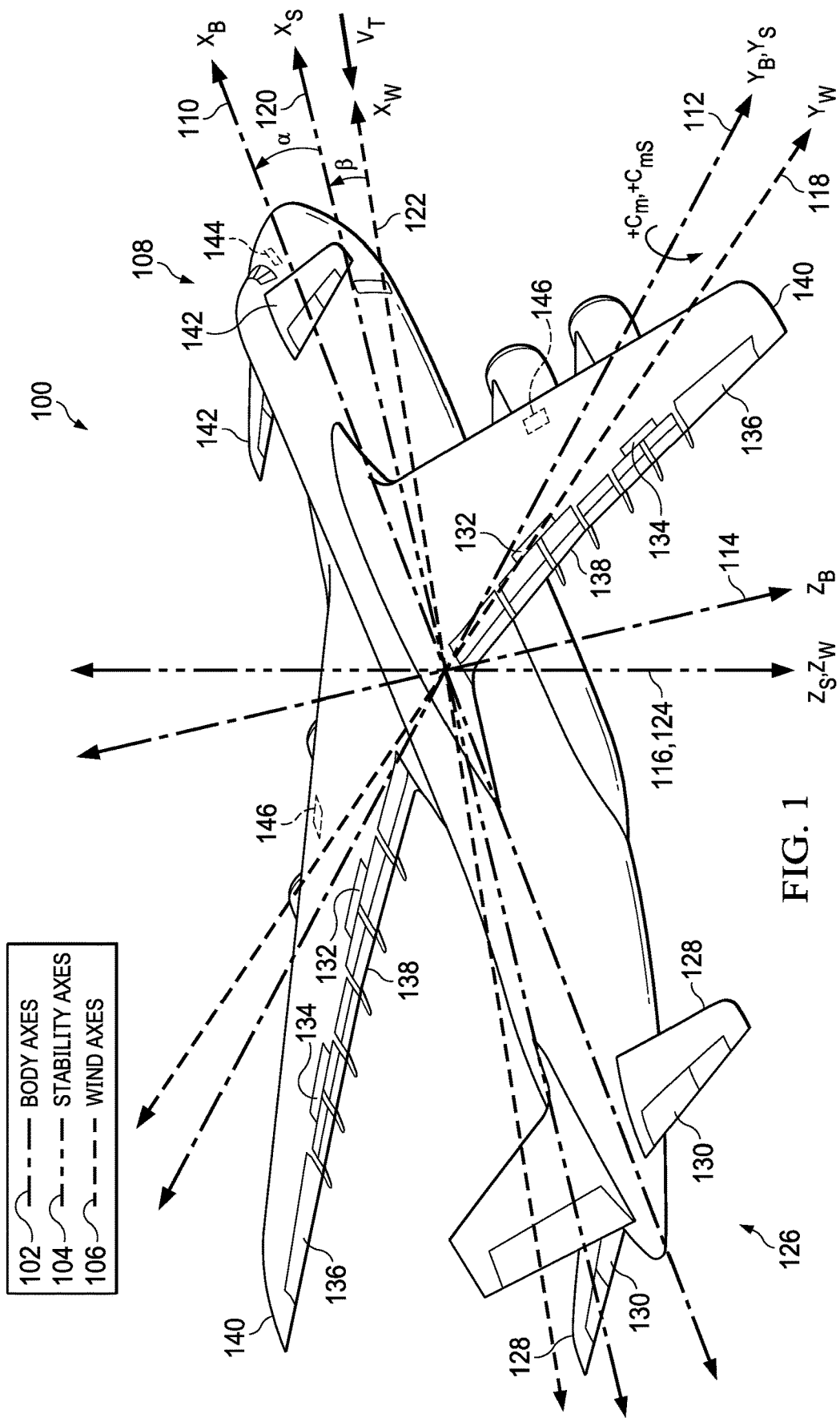
FIG. 1 is an illustration of axes of an aerospace vehicle in accordance with an illustrative example.

A wind gust may be a change in a direction or magnitude of a wind impacting an aerospace vehicle. A wind gust may act as an exogenous influence that causes a state of an aerospace vehicle to deviate from a commanded intended state for the aerospace vehicle. A wind gust may be time dependent and transient. As used herein, the term exogenous indicates an influence outside of one generated by a control input unit of the aerospace vehicle, whether the control input unit is activated manually or through automation.

The state of the aerospace vehicle may be defined relative to any of several conditions. The conditions may include, without limitation, a trajectory of the aerospace vehicle, an energy state of the aerospace vehicle, a stability state of the aerospace vehicle, a responsiveness of the aerospace vehicle, a configuration of the aerospace vehicle, a position of the aerospace vehicle in space, an orientation of the aerospace vehicle relative to a set of axes, a condition of a system on the aerospace vehicle, or a combination of any of the above.

A wind gust and/or an input for the aerospace vehicle to perform a maneuver may cause a load on a part of an aerospace vehicle, such as without limitation a wing, to increase above a desired level. A wind gust or an input for the aerospace vehicle to perform a maneuver may cause a load on a part of an aerospace vehicle, such as without limitation the wing, to increase a bending moment of the part above a desired level.

Existing solutions to prevent an undesired load on the part of the aerospace vehicle, and resultant undesired bending moments on the part, rely on feedback control systems that measure a load on the part in operational conditions. Existing solutions may include without limitation, an accelerometer for measuring a load factor on a wing. A technological problem of existing systems is that they require the lift on the wing to have already developed and be measured and processed before a control signal is produced to direct a control action to alleviate the wing load.

A technological problem of existing systems is that a control action based upon an accelerometer feeding into a positive feedback loop may result in instability of the aerospace vehicle. Existing solutions to avoid instability of the aerospace vehicle include heavy filtering of the control signal as it is processed to generate a control action. Filtering requirements may add equipment and weight to an aerospace vehicle.

Added equipment and weight on the aerospace vehicle reduce fuel efficiency and other desired performance characteristics for the aerospace vehicle. Added equipment and weight on the aerospace vehicle may reduce a reliability of the aerospace vehicle. Added equipment and weight on the aerospace vehicle may require structural components of the aerospace vehicle to be stronger to support additional loads on the aerospace vehicle from the added weight. A technological problem therefore exists whereby structures of an aerospace vehicle must be made of a thickness and a weight sufficient to handle added loads and resultant bending moments that may result from limitations of existing wing load alleviation systems.

A technological problem of existing systems is that filtering the control signal delays the processing of the control signal and generation of a control action to reduce an undesired wing load. Thus, a technological problem exists where existing solutions to avoid instability and/or an undesired wing load for the aerospace vehicle suffer delays in deriving, transmitting, and executing a control action. The time delays may result in an inability to execute a response, or an instability due to improper timing of the execution of a response that reduces a load alleviation benefit achieved from existing wind gust and/or maneuver response systems.

A technological problem also exists whereby existing solutions for wing load alleviation are not able to discriminate a threshold for a wind gust and/or aerospace vehicle maneuvering that does not require a control action to keep the wing load below a desired level. Thus, filtering delays from an existing wind gust and/or aerospace vehicle maneuvering alleviation system may be applied to a control signal when not required, and may therefore generate undesired instability and/or unnecessary control actions. Unnecessary control actions may increase drag on an aerospace vehicle and thereby increase a fuel consumption by the aerospace vehicle. Hence, what is needed is a technical solution to the above listed and other issues related to undesired loads upon a part of an aerospace vehicle.

Examples described herein consider and take into account that an aerospace vehicle may contain a flight control system that contains a control augmentation system that attempts to enhance a stability and/or maneuverability and/or expand an operating envelope for the aerospace vehicle by estimating a future state of the aerospace vehicle and augmenting or de-augmenting commands to the control elements of the aerospace vehicle. The estimate may include an estimate of an exogenous influence and its effect on a part of the aerospace vehicle. The more precise the estimate of the future state can be, the more precise control augmentation may be to produce a desired state, stability, and/or maneuverability for the aerospace vehicle. The more rapidly the estimate can be made, the more effectively commands may be derived and executed to move a control element to produce or maintain a desired state of the aerospace vehicle.

Examples described herein consider and take into account that what is needed to overcome technological limitations of existing load alleviation systems for an aerospace vehicle is a feedforward control scheme which is not susceptible to instability. What is needed is a gust indicator which is insensitive to control action. Thus, what is needed is an advanced notification of a wind gust that increases a time window available and/or reduces a time window required to determine and perform a control action that preempts the wind gust from causing an undesired load on the wing of the aerospace vehicle. What is needed is a gust load alleviation machine and/or process that can discriminate which gusts require a control action to provide a required load alleviation and which gusts do not require a control action to provide a required load alleviation.

What is needed is a machine and/or system and/or process that provides a greater effectiveness in gust load alleviation. What is needed is a machine and/or system and/or process that preempts an undesired load upon a wing. What is needed is a machine and/or system and/or process that provides a greater effectiveness in gust load alleviation that preempts an undesired bending of a wing on an aerospace vehicle, as well as addressing other load issues for the aerospace vehicle.

Examples described herein may utilize, and improve upon technologies described in previous U.S. Pat. No. 9,639,089 which fully incorporates U.S. Pat. No. 8,774,987. Both of those U.S. Patents are issued to The Boeing Company and the full content thereof is incorporated herein in their entirety by reference.

A control element on an aerospace vehicle may include an element that may control, without limitation, a movement, a trajectory, a configuration, an energy state, an orientation, a location in space, or combinations thereof, for the aerospace vehicle. A control element may include, without limitation, a control surface, an engine, some other system on the aerospace vehicle, or combinations thereof.

Command of the control surface of an aerospace vehicle may be executed through mechanical connections between a control input unit and the control element. A control element may include any part of the aerospace vehicle that may control a state of the aerospace vehicle. Mechanical linkages may include mechanical mixers configured to apply control laws and/or gain and/or control load feel between the control input unit and the control surface.

The illustrative examples recognize and take into consideration that existing solutions to prevent an undesired load on the aerospace vehicle rely on feedback control systems that measure a load on the part in operational conditions. The illustrative examples are based on a gust and maneuver predictor that eliminates a need for feedback control systems that measure a load on the part in operational conditions.

Additionally, command of the control surface for an aerospace vehicle may be executed through a control augmentation system. A control augmentation system may include, without limitation, a digital control system. A digital control system may be, without limitation, a fly-by-wire (FBW) system. The control augmentation system may augment or replace mechanical flight controls of an aerospace vehicle with an electronic interface. As such, a control input unit may not be physically connected to the control surface, engine, or other system by cables, linkages, or other mechanical systems. Instead, the commands from a control input unit are converted to electronic signals transmitted by wires, optical fibers, over an air-interface, or some combination thereof, to an actuator at the control surface, engine, or other system.

As described in the previously referenced patents: U.S. Pat. No. 9,639,089 which fully incorporates U.S. Pat. No. 8,774,987, a load alleviation sub-system may be a part of a flight control system for an aerospace vehicle. The examples provided herein recognize and take into consideration that a load alleviation sub-system may reduce a load on a wing measured as normal to a longitudinal axis of a body of the aerospace vehicle.

A flight control computer may generate commands to a control element that may include a flight control surface, an engine, or other devices that control movement of the aerospace vehicle. A flight control computer in a control augmentation system may incorporate a processor programmed with some control laws to regulate stability, damping, responsiveness, or combinations thereof for the aerospace vehicle. With control augmentation, some commands to the control surface, engine, or other system, are not specifically directed by an input from a pilot to the control input unit, but are determined by a flight control computer in the control augmentation system. A load alleviation sub-system may be a part of or interface with the flight control computer and/or the control augmentation system.

The different components in a control augmentation system may communicate with each other using different types of communications architectures. A control augmentation system may use a data bus, such as those used in computer systems. The data bus may reduce the amount of wiring between components. Depending on the amount of traffic on the data bus, commands may reach intended components later than desired. A network may be used in addition to or in place of a data bus system to provide communications between processors, actuator control modules, and/or flight control modules. This situation creates a timing issue in which commands sent to a component, such as without limitation an actuator control module, may incur some delay in time before receipt and actuation of the commands.

For example, the delays in inputs for controlling a control surface may result in technological problems, including without limitation: undesired and/or unacceptable degraded human-machine handling quality, undesired and/or unacceptable excursions from structural operating limitations of the aerospace vehicle, the aerospace vehicle generating greater noise than desired, lower passenger comfort, or combinations thereof.

Still further, currently, performance of control laws for control augmentation systems suffer several technological limitations. Control law programs rely upon models that do not know precisely what wind gusts may be impacting a particular part on an aerospace vehicle in flight at a precise moment in time.

For 1 g flight at a constant altitude, total lift for aerospace vehicle will equal a gross weight of aerospace vehicle. Thus, a command input to a control augmentation system that intends to hold the aerospace vehicle in level-flight experiencing a constant 1 g load as it encounters a significant wind gust—if left unchanged—could result in unintentional and undesired change in the state of the aerospace vehicle that could include changes that generate unintended movement and loading that may result in an unintended trajectory or undesired loading on a part of the aerospace vehicle.

Governmental airworthiness certification requirements may establish strength and performance characteristics required for an aerospace vehicle under various operating conditions. As a non-limiting example, U.S. Federal Aviation Administration Regulation Part 25, Section 337 addresses airworthiness standards re limit maneuvering load factors and requires:

(a) Except where limited by maximum (static) lift coefficients, the airplane is assumed to be subjected to symmetrical maneuvers resulting in the limit maneuvering load factors prescribed in this section. Pitching velocities appropriate to the corresponding pull-up and steady turn maneuvers must be taken into account.

(b) The positive limit maneuvering load factor n for any speed up to Vn may not be less than 2.1+24,000/(W+10,000) except that n may not be less than 2.5 and need not be greater than 3.8—where W is the design maximum takeoff weight.

(c) The negative limit maneuvering load factor—

(1) May not be less than −1.0 at speeds up to VC; and (2) Must vary linearly with speed from the value at VC to zero at VD.

(d) Maneuvering load factors lower than those specified in this section may be used if the airplane has design features that make it impossible to exceed these values in flight.

In a similar non-limiting example, U.S. Federal Aviation Administration Regulation Part 25, Section 341 (2)(i) addresses airworthiness standards re gust and turbulence loads and requires:

At airplane speeds between $V_B$ and $V_C$: Positive and negative gusts with reference gust velocities of 56.0 ft/sec EAS [equivalent air speed] must be considered at sea level. The reference gust velocity may be reduced linearly from 56.0 ft/sec EAS at sea level to 44.0 ft/sec EAS at 15,000 feet. The reference gust velocity may be further reduced linearly from 44.0 ft/sec EAS at 15,000 feet to 20.86 ft/sec EAS at 70,000 feet, (ii) At the airplane design speed VD: The reference gust velocity must be 0.5 times the value obtained under § 25.341 (a)(5)(i) . . . .

(7) (b) Continuous turbulence design criteria. The dynamic response of the airplane to vertical and lateral continuous turbulence must be taken into account. The dynamic analysis must take into account unsteady aerodynamic characteristics and as significant structural degrees of freedom including rigid body motions. The limit loads must be determined for all critical altitudes, weights, and weight distributions as specified in § 25.321(b), and all critical speeds within the ranges indicated in § 25.341(b)(3)

To meet certification load requirements for structures on the aerospace vehicle, such as without limitation a wing, are designed of certain materials with certain thicknesses and a resultant weight. A load alleviation system on the aerospace vehicle may reduce resultant loads under certain conditions, such as a wind gust and/or an input for the aerospace vehicle to perform a particular maneuver, and thus reduce a strength, thickness, and/or weight required for support members of the wing, or other structure on the aerospace vehicle.

Further, the examples herein recognize and take into consideration that a current solution to unintentional and undesired aerospace vehicle performance characteristics that may cause exceedance of structural and/or other limitations for the aerospace vehicle, may be to add a load limiter that constrains the control laws governing the control elements on the aerospace vehicle. Constraints applied by a load limiter may filter out or cancel inputs during operations in particular parts of an operating envelope for the aerospace vehicle. Although constraints applied may prevent exceeding structural and/or other limits for the aerospace vehicle, they may also create a further technological difficulty of restricting an operational envelope or a responsiveness available to an operator of the aerospace vehicle to less than the original desired operational and structural limits of the aerospace vehicle.

As a non-limiting example, commands to a control element for the aerospace vehicle may be constrained, such that regardless of an input received from a control input unit during flight through a particular flight region, commands to a control element would not exceed commanding a constrained level of change in order to prevent effects of an instrumentation error and/or aerodynamic effects not fully accounted for in an aerodynamic database or full control laws of the aerospace vehicle from causing an exceedance of a structural limit for the aerospace vehicle. Hence, the aerospace vehicle suffers the technological problem of being constrained from utilizing a full structural envelope of the aerospace vehicle in the flight region for which commands have been constrained. In other words, as a non-limiting example, instead of being able to command a maneuver for the aerospace vehicle fully to a structural limit during flight in the particular flight region, the command is constrained from reaching the control element and thus the operating envelope of the aerospace vehicle is reduced from its originally designed structural limits.

Alternately, as described in the cited previous patents, a load alleviation sub-system will predict an anticipated load on a part, such as without limitation a wing, and derive and activate control element commands to minimize loads that develop on the part. Because wind gusts can be unexpected and/or unpredictable, it is recognized that in some operating environments, a wind gust can cause a load on a part of the aerospace vehicle 100 to be greater than the load intended by an input to a control unit for the aerospace vehicle. Hence, the aerospace vehicle is designed with parts that are of a sufficient strength, thickness, weight, and other characteristics sufficient to withstand loads that are greater than loads that may be intended by inputs to a control unit for the aerospace vehicle.

Therefore, it would be desirable to nave a machine and/or process that take into account at least some of the issues discussed above, as well as other possible issues. For example, it would be desirable to have a machine and/or process that reduce issues that limit an aerospace vehicle's available operating envelope due to unintended, undesirable, and/or inconsistent loads on a part of the aerospace vehicle due to a wind gust.

The illustrative examples recognize and take into account one or more different considerations. As a non-limiting example, the illustrative examples recognize and take into account that a wind gust can cause unintended and/or undesired motion and/or a load on a part of the aerospace vehicle that requires a change to an existing control element of the aerospace vehicle in order to achieve an intended and/or desired loading and/or state and/or trajectory of the aerospace vehicle.

The illustrative examples recognize and take into account that control element movements may lag behind from helpful and/or intended positions. As a result, commands to control elements in the aerospace vehicle may aggravate instead of mitigate an unintended and/or undesirable loading and/or state and/or trajectory of the aerospace vehicle operating through or in some parts of the operating envelope.

One approach tried to prevent unintended and/or undesirable loading and/or state and/or trajectory of the aerospace vehicle operating through or in some parts of the operating envelope, has been to apply control laws that constrain aircraft responsiveness and effectively constrain access to a full operating envelope for the aerospace vehicle. In other words, the illustrative examples recognize and take into account that some current control laws and control augmentation systems suffer the technological problem of constraint tightening an operating envelope for an aerospace vehicle that limits command authority over flight control systems for an aerospace vehicle and/or can cause other aerodynamic problems or limitations to performance.

In contrast to current constraints on an operating envelope, examples illustrated herein can be attached to an aerospace vehicle and provide an adaptive estimate, of an exogenous aerodynamic disturbance such as without limitation a wind gust, and its effects on a dynamic response and state of the aerospace vehicle. The illustrative examples recognize and take into account that even advanced currently existing control augmentation systems have not produced technical solutions to predict a load on a part of the aerospace vehicle due to a gust impacting the aerospace vehicle and/or an input for the aerospace vehicle to perform a particular maneuver. In contrast, a novel predictor component in the illustrative examples provides a precise estimate of a load on a first part of an aerospace vehicle caused by a wind gust from the wind gust impacting a second part of the aerospace vehicle at a time preceding the wind gust impacting the first part.

The illustrative examples also recognize and take into account that existing systems attempting to predict a load from a wind gust impacting a second part of the aerospace vehicle at the time preceding the wind gust impacting the first part require using notch and non-linear filters for deriving a necessary action by a control element of the aerospace vehicle, and moving a control element promptly enough to effectively reduce a load on the second part when the wind gust impacts the second part. However, using notch and non-linear filters extends the time required to derive an alleviation for effects of the wind gust impacting the second part of the aerospace vehicle and derive an alleviation command.

Similar requirements for notch and non-linear filters in existing systems attempting to predict a load at a time in the future from an input for the aerospace vehicle to perform a particular maneuver. Hence, currently existing maneuvering alleviation systems suffer the same technological problem of the time delay caused by notch and/or non-linear filtering to derive a load alleviation command.

In contrast, the illustrative examples herein can be added as an adaptor to any existing control system and thus can overcome undesired exogenous aerodynamic disturbances on an aerospace vehicle. In other words, even if it only becomes apparent that an aerospace vehicle must deal with a particular recurring undesired state after the aerospace vehicle has been designed and manufactured and is flying in operations, illustrative examples herein can be added to mitigate or preclude the undesired state from occurring.

Some existing methods or systems for managing undesired loads on an aerospace vehicle create further technological problems. Unintentional and undesired aerospace vehicle performance characteristics have been avoided in an unrefined manner by adding constraints onto the control laws governing commands sent to the control elements on the aerospace vehicle. The constraints added may broadly filter out or cancel inputs in particular parts of an operating envelope for the aerospace vehicle.

Although constraints applied may prevent exceeding structural and/or other limits for the aerospace vehicle, they may also create a further technological difficulty of restricting an operational envelope available to an operator of the aerospace vehicle to less than the original structural limits of the aerospace vehicle.

The illustrative examples herein, recognize and take into account that a set of axes used to describe an orientation of an aerospace vehicle may be selected from, without limitation, a body axes, a stability axes, or a wind axes as shown by FIG. 1. FIG. 1 is an illustration of axes of an aerospace vehicle depicted in accordance with an illustrative example. Specifically, motion of and forces on aerospace vehicle 100 may be represented by body axes 102, stability axes 104, and/or wind axes 106. Body axes 102 may be fixed relative to structure 108 of aerospace vehicle 100 and comprise longitudinal (or roll) axis $X_B$ 110, lateral (or pitch) axis $Y_B$ 112, and directional (or yaw) axis $Z_B$ 114 orthogonal to both $X_B$ 110 and $Y_B$ 112. The stability axes may be fixed such that stability axis $Z_S$ 116 aligns with a vector of the Earth's force of gravity. Stability axis Ys 112 aligns with pitch axis $Y_B$ 112, and stability axis $X_S$ 120 is orthogonal to both $Y_S$ 118 and $Z_S$ 116 and aligned with roll axis $X_B$ 110 in an $X_B$-$Z_B$ plane of body axes. Wind axes may be fixed by a trajectory through space of the aerospace vehicle 100, such that wind axis $X_W$ 122 aligns with a trajectory of the aerospace vehicle 100 in an $X_S$-$Y_S$ plane of stability axes 104, wind axis $Z_W$ 124 aligns with stability axis $Z_S$ 116, and wind axis $Y_W$ 118 is orthogonal to both axes $X_S$ 120 and $Z_S$ 116. Without limitation, aerospace vehicle 100 may be an aircraft. Without limitation, aerospace vehicle 100 may be a transport aircraft.

Aerospace vehicle 100 may have a pitch control element. The pitch control element may control movement of aerospace vehicle 100 at least about pitch axis $Y_B$ 112. Without limitation, the pitch control element may be horizontal stabilizer 128 or a set of stabilators. Without limitation, stabilators may be mounted on an empennage or tail 126 of aerospace vehicle 100. Each stabilator in the set of stabilators and/or horizontal stabilizer 128 may also include at least one elevator 130 to aid in control of lift forces on horizontal stabilizer 128 and of pitch for aerospace vehicle 100.

Aerospace vehicle 100 may also have a lift control element. The lift control element may include without limitation: inboard spoilers 132, outboard spoilers 134, ailerons 136, and/or flaperons 138, or combinations thereof on wings 140. The lift control element may also include without limitation, canards 142 devices similar to inboard spoilers 132, outboard spoilers 134, ailerons 136, and/or flaperons 138, or combinations thereof mounted on canards 142. In other words, while the illustrative examples described herein may apply to an aerospace vehicle 100 with any of the control elements listed above, such as without limitation, canards 142, none of the particular elements is required with the illustrative examples herein.

Aerospace vehicle 100 may also have sensors mounted at locations on aerospace vehicle 100 for sensing an angle of attack, α, and/or loads experienced on aerospace vehicle 100. Forward sensor 144 may be without limitation an angle of attack vane or a light detection and ranging (LIDAR) system such as described at least in U.S. Pat. No. 9,639,089 which fully incorporates U.S. Pat. No. 8,774,987.

Wing sensor 146 may be a sensor located downwind from forward sensor 144. In other words, an airflow impacts forward sensor 144 at a point in time previous to the airflow impacting wing sensor 146. Without limitation wing sensor 146 may be an inertial sensor used to measure a load on, angle of attack of, and/or other parameters for a wing of wings 140.

Forward sensor 144 and wing sensor 146 in FIG. 1 illustrate relative and not exact locations of the sensors. Further, although one sensor is shown for forward sensor 144 and only one wing sensor 146 is shown on each of the wings 140, additional sensors may be present in other locations and be in communication with and/or considered as being a part of forward sensor 144. Similarly, additional sensors may be present in other locations and be in communication with and/or considered as being a part of either wing sensor 146.

Still further, other parts of aerospace vehicle 100 may have a sensor or sensors located downwind of forward sensor 144 like wing sensor 146 configured to measure a load and/or angle of attack, and/or other parameters at other locations of aerospace vehicle 100. The other locations may include without limitation, at canards 142, horizontal stabilizer 128, on a vertical stabilizer and/or rudder, on an engine pylon, at points along a fuselage of aerospace vehicle 100, or at other locations on aerospace vehicle 100.

Similarly, items 128-146 in FIG. 1, do not intend to show precise locations, groupings, numbers, or size of those items as they may be featured on an aerospace vehicle, such as without limitation aerospace vehicle 100 illustrated in FIG. 1. Items 128-146 are illustrative to show relative relationships and general locations for relational descriptions relative to novel examples of technological improvements as described below.

A pitch command input that holds the aerospace vehicle in level flight experiencing a constant 1"g" load—if left unchanged when a wind gust impacts the aerospace vehicle—could result in an unintentional and undesired change in the state of the aerospace vehicle that could include changes to a pitching moment of the aerospace vehicle that may generate an increased "g" loading on the wing, as well as increased lift being produced by the wing and thus an increase in a bending moment experienced by the wing. The "g" unit represents a force equal to the Earth's force of gravity applied along axis $Z_B$ 114 perpendicular to longitudinal axis $X_B$ 110 through the body of aerospace vehicle 100, and is called positive when acting in a direction, which would push a pilot in aerospace vehicle 100 down into his seat, and called negative when acting in a direction, which would pull a pilot up out of his seat. Acceleration along directional (or yaw) axis $Z_B$ 114 is also referred to as a "normal load", $N_z$, for aerospace vehicle 100.

Figure 2:
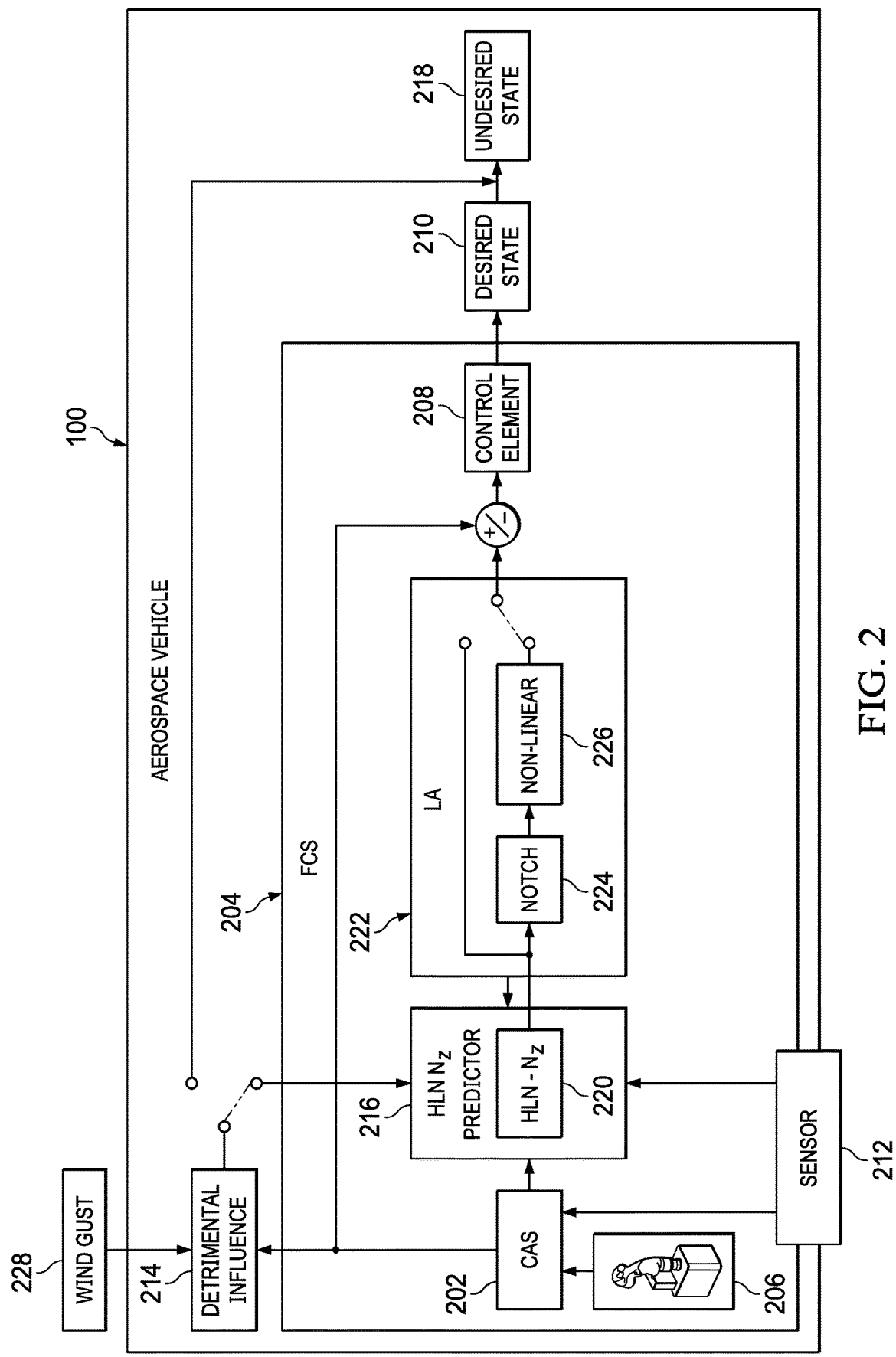
FIG. 2 is an illustration of a Ho-Ly-Niemiec (HLN) estimator improvement to a control augmentation system of an aerospace vehicle in accordance with an illustrative example.

Looking now to FIG. 2, an illustration of a Ho-Ly-Niemiec (HLN) estimator improvement to a control augmentation system of an aerospace vehicle is depicted in accordance with an illustrative example. More specifically, as depicted in FIG. 2, control augmentation system (CAS) 202, for flight control system (FCS) 204 may receive an input 206 intended activate control element 208 to generate and/or sustain desired state 210 for an aerospace vehicle, such as without limitation aerospace vehicle 100 shown in FIG. 1. Input 206 may be from a manned input device unit, or from an automated input signal system. Automated input signal system may be, without limitation, an autopilot system. Without limitation, autopilot systems may output as input 206 based upon feedback from control augmentation system 202. Thus, input 206 may represent a command for aerospace vehicle 100 to perform a maneuver.

Sensor 212 on the aerospace vehicle may sense parameters that define the state of aerospace vehicle 100 and provide the parameters to CAS 202, as well as into HLN-NZ predictor 220, and although not depicted in FIG. 2, to other systems on aerospace vehicle 100 as well. Sensor 212 is shown as a single item, but one of ordinary skill in the art recognizes that sensor 212 may represent a number of sensors that may be located at different locations. Sensors among the number of sensors may be independent of each other or in communication with each other. Sensor 212 may represent, without limitation, an angle of attack vane or a measurement system located on aerospace vehicle 100. Sensor 212 may also sense and share parameters for conditions upwind from sensor 212. In other words, without limitation, sensor 212 may be a light detection and ranging (LIDAR) system located on aerospace vehicle 100.

As FIG. 2 indicates, sensor 212 may also represent without limitation, a measurement system located outside of aerospace vehicle 100. As such, without limitation sensor 212 may represent an inertial unit on aerospace vehicle 100 and/or a tracking system off aerospace vehicle 100, such as without limitation a ground, seaborne, airborne, or space-based, radar or other tracking system.

Without limitation, a state of aerospace vehicle 100 may be described as a vector with many parameters, among which are included, without limitation: V, velocity; $\alpha$, angle of attack; $\Phi$, roll angle; $\theta$, pitch angle; q, pitch rate; p, roll rate; r, yaw rate; $N_z$, acceleration on axis $Z_B$ 114 shown in FIG. 1; $N_y$, acceleration on axis $Y_B$ 112 shown in FIG. 1; $N_x$, acceleration on axis $X_B$ 110 shown in FIG. 1; $\beta$, sideslip angle; and h, altitude, for the aerospace vehicle as well as other parameters derived from those listed a above, and/or discussed in U.S. Pat. No. 9,639,089 which fully incorporates U.S. Pat. No. 8,774,987, and are both fully incorporate herein.

Detrimental influence 214 may approach aerospace vehicle 100. FIG. 2 graphically represents that without Ho-Ly-Niemiec (HLN) $N_z$ predictor 216, detrimental influence 214 will be able to progress to affect desired state 210 to become altered into undesired state 218. Without limitation, detrimental influence 214 may represent a state upwind from aerospace vehicle 100. Detrimental influence 214 may come from outside aerospace vehicle 100. Detrimental influence 214 may be an exogenous environmental influence, such as without limitation from wind gust 228. Detrimental influence 214 may come from on/within aerospace vehicle 100, such as without limitation from undesired effects of input 206 and/or of undesired effects of processing by CAS 202.

As described in more detail below, HLN $N_z$ predictor 216 recognizes approaching detrimental influence 214, and alleviates the detrimental influence's effect upon aerospace vehicle 100 by deriving HLN-$N_z$ 220 to send to load alleviation sub-system (LA) 222. LA 222 of this application may be, without limitation, equivalent to load alleviation sub-system 204 described in U.S. Pat. No. 9,639,089 which fully incorporates U.S. Pat. No. 8,774,987, and are both fully incorporated herein.

HLN-$N_z$ 220 represents a technological improvement that creates a novel and precise predicted value for a normal load (a load acting along $Z_B$ axis 114 of FIG. 1) experienced by a part of aerospace vehicle 100. Without limitation, the part of aerospace vehicle 100 that HLN-$N_z$ 220 may be a prediction for, may be any part for which an $N_z$ value may be directly (or indirectly through derivation from sensed data)

sensed. In other words, HLN $N_z$ predictor 216 predicts a future load HLN-$N_z$ 220 on a part of aerospace vehicle 100 based upon a predicted future state, such as without limitation undesired state 218 of aerospace vehicle 100.

LA 222 uses HLN-$N_z$ 220 to modify CAS 202 commands to control element 208 that preempt detrimental influence 214 effects upon aerospace vehicle 100 and thereby maintain aerospace vehicle 100 in desired state 210. Desired state 210 may represent a continuation of a state of aerospace vehicle 100 that existed prior to detrimental influence 214 impacting aerospace vehicle 100, and/or a new state for aerospace vehicle 100 that is desired as detrimental influence 214 begins to impact aerospace vehicle 100.

Additionally, HLN $N_z$ predictor 216 provides a technological improvement whereby a precision of HLN-$N_z$ 220 may be so accurate that LA 222 may eliminate a need for and/or use of notch filter 224 and/or non-linear filter 226 as commonly exist in current load alleviation systems. Elimination of a need/use of notch filter 224 and non-linear filter 226 by LA 222 reduces processing time and allows alleviations commands to be generated and sent more often and therefore more refined and precisely to control element 208 than current load alleviation systems capabilities.

More rapid and refined commands based upon more precise HLN-$N_z$ 220 load information produces the technical benefit of generation of alleviation command 504 more rapidly. Hence, over a given period of time for wind gust 228 to travel to a particular point downwind from its initial impact on aerospace vehicle 100, the reduced time required for LA 222 to generate an alleviation command results in a greater number of alleviation commands that can be generated and executed by control element 208 during the given period of time for wind gust 228 to travel to a particular point downwind from its initial impact on aerospace vehicle 100. Therefore, each alleviation command generated by LA 222 may be more refined and precise, and particularly so when receiving HLN-$N_z$ 220 that is more precise than sensed or processed $N_z$ value available in currently existing load alleviation systems.

As a result of more refined and precise alleviation commands, LA 222 may manage loads and resulting bending moments on parts of aerospace vehicle 100 that allow an increase in: stability, maneuverability, and/or operating envelope for aerospace vehicle 100. As a result of more refined and precise alleviation commands, LA 222 may manage loads and resulting bending moments on parts of aerospace vehicle 100 that allow an increase in reliability, durability, and/or a life-span, of parts on aerospace vehicle 100. As a result, a required strength, rigidity, and/or thickness and weight of components of a part in aerospace vehicle 100 may also be reduced.

As will be described in further detail below, a source of detrimental influence 214 may be wind gust 228, an output from CAS 202, or some other exogenous disturbance. As will be described in further detail below, an output from CAS 202 if continued over time may lead to detrimental influence 214 and generate undesired state 218. As a non-limiting example, an input that starts a pitch up by increasing a "g" loading on a wing of aerospace vehicle 100 could result in the "g" load increasing to and past the "g" limit of aerospace vehicle 100 if the increase in "g" loading is not alleviated before the limit is reached.

Figure 3:
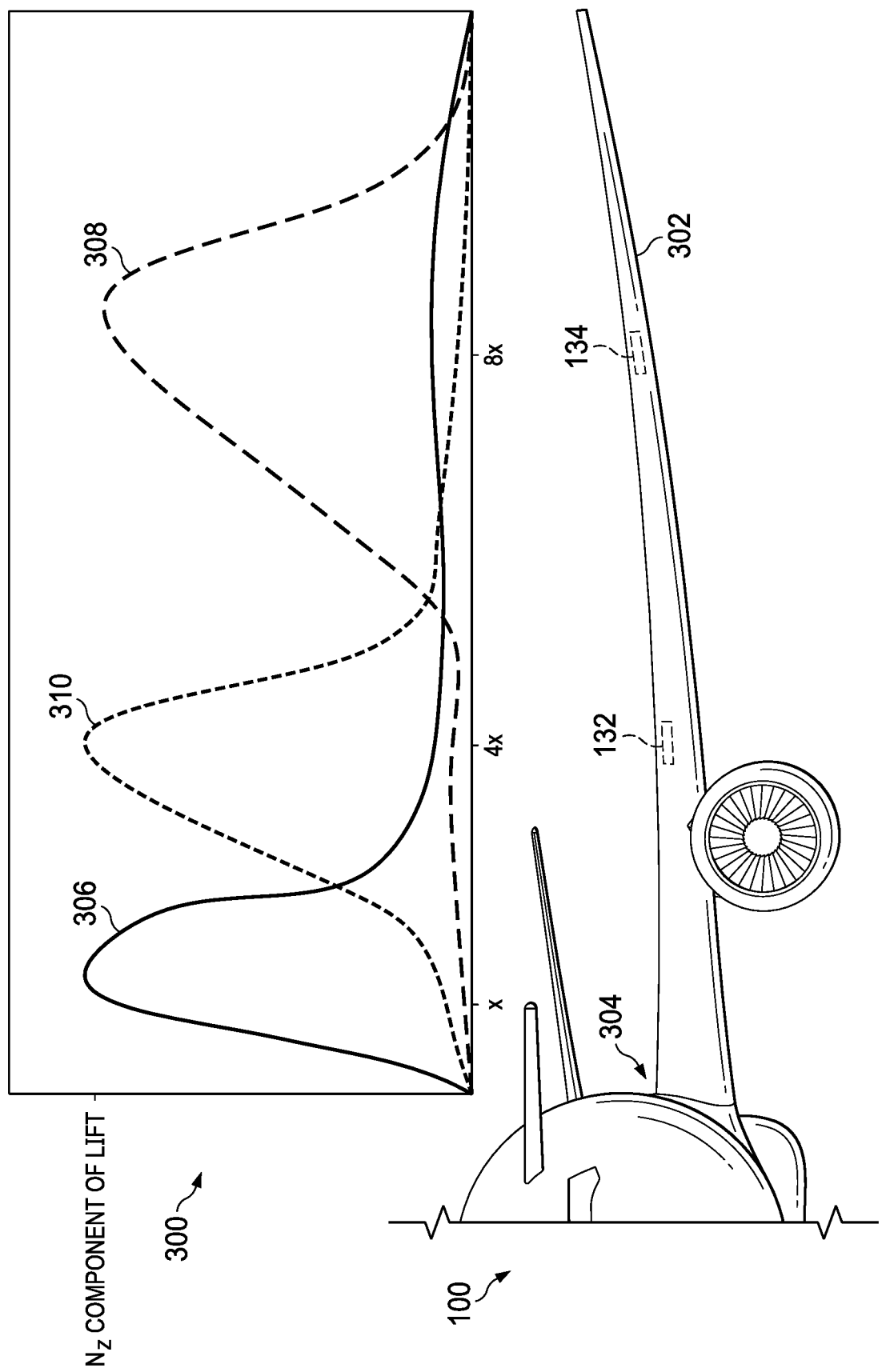
FIG. 3 is an illustration of three lift distributions across a wing, each with a same total lift value in accordance with an illustrative example.

One of ordinary skill in the art will recognize that lift provided by a part is comprised of lift forces that may vary at different points along the part. As a non-limiting example, FIG. 3 is an illustration of three lift distributions across a wing, each with a same total lift value in accordance with an illustrative example. Wing 302 may be one of wings 140 shown in FIG. 1. Wing 302 may have a wing root 304. Wing root 304 represents a location where wing 302 is connected to a support structure of aerospace vehicle 100. The vertical axis of chart 300 shows relative values for normal load, $N_z$, component of lift at particular locations along wing 302. The horizontal axis represents relative distances from wing root 304 to the $N_z$ values along a span of wing 302. Wing root 304 represents a location where wing 304 joins a frame of aerospace vehicle 100.

A normal load component of lift produced by wings 140 of aerospace vehicle 100 may differ at various chord segments along a span of the wing. Hence, for any given value for a total lift produced by wing 302, a bending moment experienced at wing root 304 may vary depending on values of lift at various chord segments along the span.

More specifically, as a non-limiting example, plot 306 represents a non-limiting distribution of lift (represented by the area under plot 306 $N_z$ values) across the span of wing 302 wherein nearly all the lift of wing 302 is produced at a distance "x" near wing root 304. Plot 308 shows nearly all the lift produced over outboard spoiler 134 at a distance 8× from wing root 304. Plot 310 shows nearly all the lift produced over inboard spoiler 132 at a distance 4× from wing root 306. Thus, although wing 302 may provide aerospace vehicle 100 a same amount of total lift for each of these plots, a bending moment about wing root 306 differs in each of these cases. The bending moment on wing root 304 for plot 308 will be 8 times, and for plot 310 4 times, the bending moment for plot 306.

Thus, as a non-limiting example, if a sensor 212 that could measure $N_z$ was located respectively at each distance x, 4×, and 8× from wing root 304 along wing 302 as shown in FIG. 3, then HLN $N_z$ predictor 216 can determine an HLN $N_z$ 220 value respectively at each of those three locations. Using the HLN $N_z$ 220 value respectively at each of those three locations, then a bending moment about each of those distances could be predicted for wing root 304. LA 222 may be configured with a mechanical device and/or specially programmed code that includes an algorithm that may include rules for managing the lift distribution across wing 302. LA 222 may provide alleviation that shifts lift production across the span of wing 302. Shifting lift production across the span of wing 302 may provide desired handling characteristics for aerospace vehicle 100, and/or manage and/or minimize an $N_z$ load at a particular location and/or a total bending moment applied to wing root 304.

Thus, HLN $N_z$ predictor 216 thereby allows for a precise prediction of not only how much additional load may be produced and how much load alleviation to sustain a desired total lift load on wing 302, but can choose locations and values for load alleviation that provide desired handling characteristics for aerospace vehicle 100 and also manage and/or minimize a total bending moment applied to wing root 304.

To further illustrate the concept, a non-limiting example is presented for a condition when wing 302 is producing a total lift of 100,000 pounds, with 30,000 pounds produced at distance x, 40,000 pounds at distance 4×, and 30,000 pounds produced at distance 8×, along wing 302. If wind gust 228 and/or input 206 result in HLN $N_z$ 220 predictions that without any load alleviation: lift at distance x on wing 302 will increase to 50,000 pounds, lift at distance 4× on wing 302 will increase to 50,000 pounds, and lift at distance 8× on wing 302 will increase 40,000 pounds, then total wing lift could remain at 100,000 pounds even if load alleviations reduce lift produced at distance 8× on wing 302 all the way down to zero. This load alleviation based upon a precise HLN $N_z$ 220 values for each of the locations along the wing span could significantly reduce a bending moment produced at wing root 304. In the example given, although total lift remains at 100,000 pounds, the bending moment about wing root 304 drops from 430,000× foot-pounds to 250,000× foot-pounds. As a non-limiting example, reducing lift at distance 8× might be achieved by a command from LA 222 to outboard spoiler 134 located at the 8× distance along wing 302.

In an alternative non-limiting example, an alternative span wise lift distribution may be achieved for the same wind gust 228 and/or input 206. An alternative load alleviation may instead reduce lift at the 4× distance to 40,000 pounds and at the 8× distance to 10,000 pounds. Thus, while total lift remains at 100,000 pounds, the bending moment about wing root 304 drops from 430,000× foot-pounds to 290,000× foot-pounds, presuming the distance x is measured in feet. As a non-limiting example, reducing lift at distance 8× might be achieved by a command from LA 222 to outboard spoiler 134 located at the 8× distance along wing 302 and reducing lift at distance 4× might be achieved by a command from LA 222 to inboard spoiler 132 located at the 4× distance along wing 302.

One of ordinary skill in the art recognizes that by using precise HLN $N_z$ 220 predicted values at various locations on wing 302, that span wise load distributions may be managed by LA 222 directing specific combinations of control element 208 for aerospace vehicle 100. As described above, control element 208 may include any number of lift generating and lift spoiling devices as may be on wing 302 of aerospace vehicle 100.

As a non-limiting example, loads at distances greater than 8× may be altered by an outboard aileron of ailerons 136 shown in FIG. 1, or by some other control element not shown in FIG. 1 such as without limitation a trim tab, air flow control system, variable geometry flight control surface, and/or combinations thereof. In other words, LA 222 may direct a particular control element 208 not only to alleviate or reduce an amount of lift being produced, but when advantageous to achieve a desired wing load or bending moment value, to supplement or increase lift as well. As a non-limiting example, movement of an aileron or a flaperon on wing 302 may increase or decrease lift thereon.

Thus, HLN $N_z$ predictor 216 provides the technical benefit of precise alleviation and management of loads across a span of wing 302 and of bending moments at wing root 304. More broadly, one of ordinary skill in the art recognizes that the derivation of precise HLN $N_z$ 220 predicted values may be applied for alleviation of a load and/or bending moments not only about wing root 304 nor just on wing 302, but for any part and about any select axis on aerospace vehicle 100 for which HLN $N_z$ predictor 216 may provide an HLN $N_z$ 220 predicted value. In other words, one of ordinary skill in the art recognizes that HLN $N_z$ predictor 216 providing for precise management of loads at specific locations along a part 508 of aerospace vehicle 100 also provides the technical benefit of precise management of bending moments about points other than just wing root 304.

Figure 4:
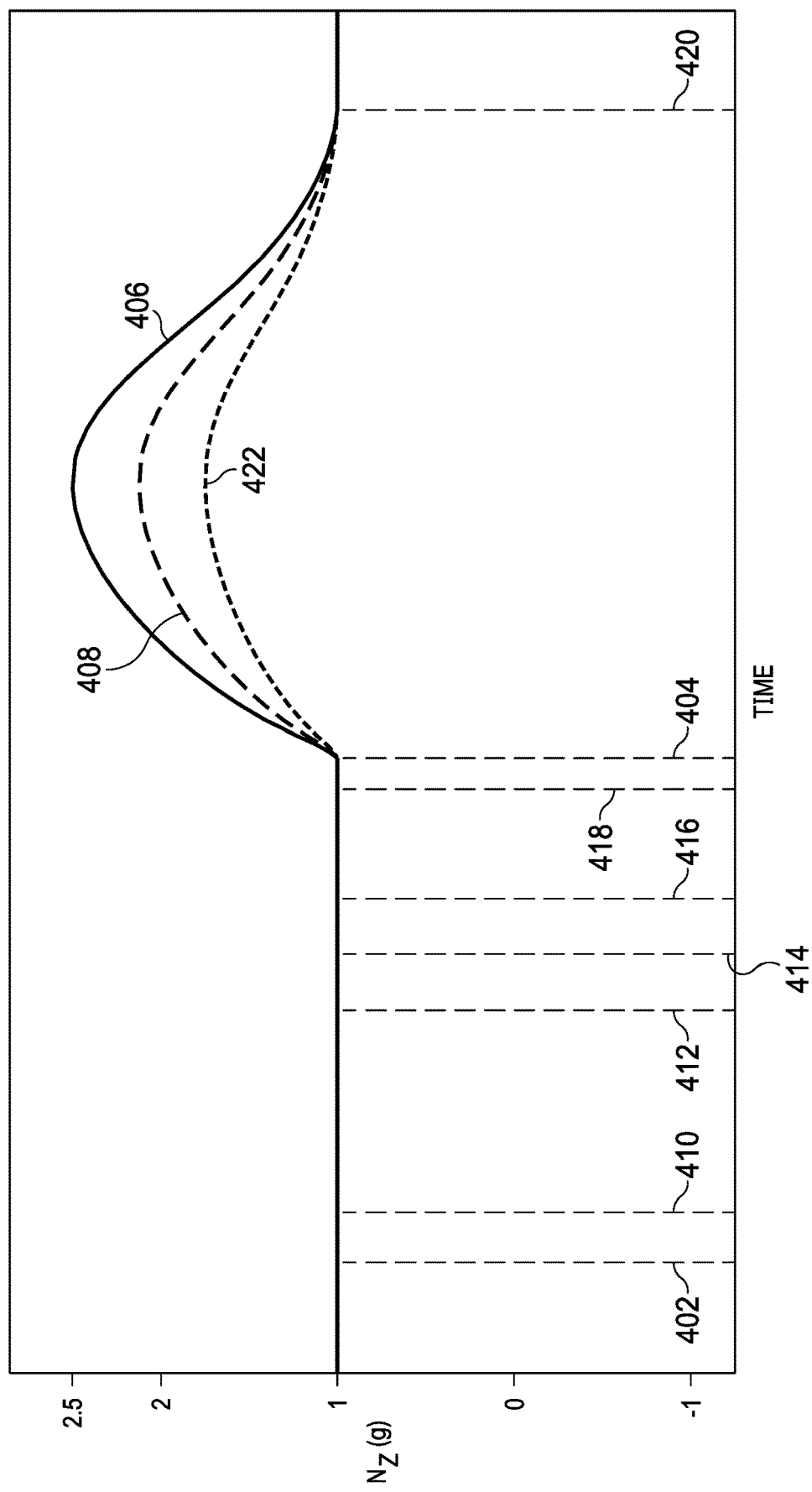
FIG. 4 is an illustration of a chart presenting a time line of lift produced by a wing of an aerospace vehicle in accordance with an illustrative example.

Looking now to FIG. 4, FIG. 4 is an illustration of a chart presenting a time line of lift produced by a wing of an aerospace vehicle in accordance with an illustrative example. Specifically, chart 400 illustrates relative values of a component (along axis $Z_B$ 114 of aerospace vehicle 100 as shown in FIG. 1) of a force acting on a part of aerospace vehicle 100, also known as the $N_z$ value on the part. Hence, the vertical axis may represent, without limitation, an $N_z$ value of a lift produced at a particular chord line of wing 302 of wings 140. The horizontal axis of chart 400 represents a passage of time from left to right.

On chart 400, event 402 represents a time at which a wind gust, such as wind gust 228 introduced in FIG. 2, affects forward sensor 144. Event 404 represents a later point in time (a time in the future from the time of events 402 and 410-418) when the same wind gust impacts the particular chord line on wing 302 at which the $N_z$ values plotted occur, which is downwind from forward sensor 144 on aerospace vehicle 100. Thus, plot 406 represents values for a z-axis component of a load, (without limitation, lift at the particular chord line on wing 302) over time without reduction by any load alleviation command from LA 222 on aerospace vehicle 100.

$N_z$ values on the vertical axis represent units of acceleration, and can be depicted relative to the acceleration of the Earth's gravity, 1 g. Plot 406 represents $N_z$ values aerospace vehicle 100 under flight control commands to maintain 1 g flight at a constant altitude. For 1 g flight at a constant altitude, total lift for aerospace vehicle 100 will equal a gross weight of aerospace vehicle 100. Wings 140 produce most of the lift for aerospace vehicle 100. The 1 g mark on chart 400 may represent a force value for $N_z$ that keeps aerospace vehicle 100 1 g flight.

As an example of the effect of a wind gust on aerospace vehicle 100 without a load alleviation system active, plot 406 shows that $N_z$ value may be increased by event 404 for the duration of the gust, which may be considered as the time from 404 to 420. In the non-limiting example shown by chart 400, due to the wind gust impacting the wing at event 404, the $N_z$ wing load increases from 1 g to 2.5 g's without a load alleviation response to counteract the wind gust effects.

As a non-limiting example, chart 400 shows the effect of the wind gust being an increase in a load at the particular chord line of wing 302. One of ordinary skill in the art recognizes that an increase of the load at the particular chord line will also increase a bending moment about wing root 304 from the location of the particular chord line. Although not shown on chart 400, a wind gust may also cause the wing load to deviate from a desired level, such as without limitation 1 g, with an opposite effect that reduces the wing load and $N_z$ value below a value indicated as 1 g on chart 400.

For the same wing 302 with a currently existing load alleviation system active, plot 408 represents the values for an $N_z$ component of lift on a wing of wings 140 over time. Plot 408 differs from plot 406 because of events 410-418. Similar to descriptions provided U.S. Pat. No. 9,649,089 which fully incorporates U.S. Pat. No. 8,774,987, at event 410, forward sensor 144 sends a signal generated by wind gust 224 affecting forward sensor 144 to a gust signal sub-system for aerospace vehicle 100. The alleviation command may include an activation time, a control element 208 to activate, and a magnitude of activation intended to adjust a load on wing 302 to remain at a desired level, such as without limitation the 1"g" level shown in FIG. 4. The lift control element on aerospace vehicle 100 selected by the alleviation command may include any component that will change a lift force and thus $N_z$ produced by wings 140.

At event 416, the gust alleviation sub-system sends the alleviation command to the lift control element selected. Event 418 marks the time that a lift control element is actually activated to alleviate a change in the wing load as the wind gust impacts the wing at event 404. In other words, event 418 occurs just prior to event 404. As a non-limiting example, chart 400 shows plot 408 deviating less from the desired 1 g level in response to the same wind gust than plot 406. Plot 408 may indicate loading achieved by a current load alleviation system, such as without limitation, load alleviation sub-system 204 described in U.S. Pat. No. 9,639,089 which fully incorporates U.S. Pat. No. 8,774,987, and are both fully incorporated herein. Plot 422 shows the novel technical benefit of examples described herein for a new machine Ho-Ly-Niemiec (HLN) NZ Predictor 216, as introduced in FIG. 2, and/or process that provides, as will be described in more detail below, a more precise estimate of wind gust 224 that will impact wing 302, and thus a precise prediction for NZ at the particular chord line, and thus a more precise and effective alleviation command to control element 208 for aerospace vehicle 100. As will be described in greater detail for subsequent figures, after processing the signal, at event 412 HLN $N_z$ Predictor 216 estimates parameters of the wind gust and creates a wind gust estimate and an HLN-$N_z$ value described more fully below. Because event 414 uses the wind gust estimate and HLN-$N_z$ 220 value, the gust signal sub-system determines an alleviation command to send to a load alleviation sub-system of the flight control system for aerospace vehicle 100. A deviation from a desired wing load, such as shown as 1 g in chart 400 for plot 422 is about one-half the deviation shown by plot 408. Thus, novel HLN $N_z$ Predictor 216 provides the technological improvement whereby a deviation from a desired wing load, such as shown as 1 g in chart 400, may be reduced by up to 50% as compared to currently existing wing load alleviation systems.

Thus, one of ordinary skill in the art understands, that even when a total wing load or total lift on a wing does not approach a limit such as shown by plot 406 in FIG. 4, that control of location and magnitude of loads from lift along a wingspan may control a value of a bending moment experienced at wing root 304. Reducing the bending moment experienced at the wing root during a flight may allow for reduction of a strength required by wing root 304. Reduction of a strength required by wing root 394 may reduce a thickness, a strength, and/or a weight of components of wing root 304 and/or members connected thereto.

The illustration and discussion of FIG. 4 for $N_z$ load values at particular chord locations along a span of wing 302 more generally may be applied and visualized as a lift force of wing 302 overall. Control of lift and bending moments generated along the span of wing 302 may also be applied to input 206 effects on loads at a time in the future for a desired maneuver. Technical benefits from a more accurate prediction of a future NZ value at a particular location on aerospace vehicle 100 will be expanded upon further below.

Figure 5:
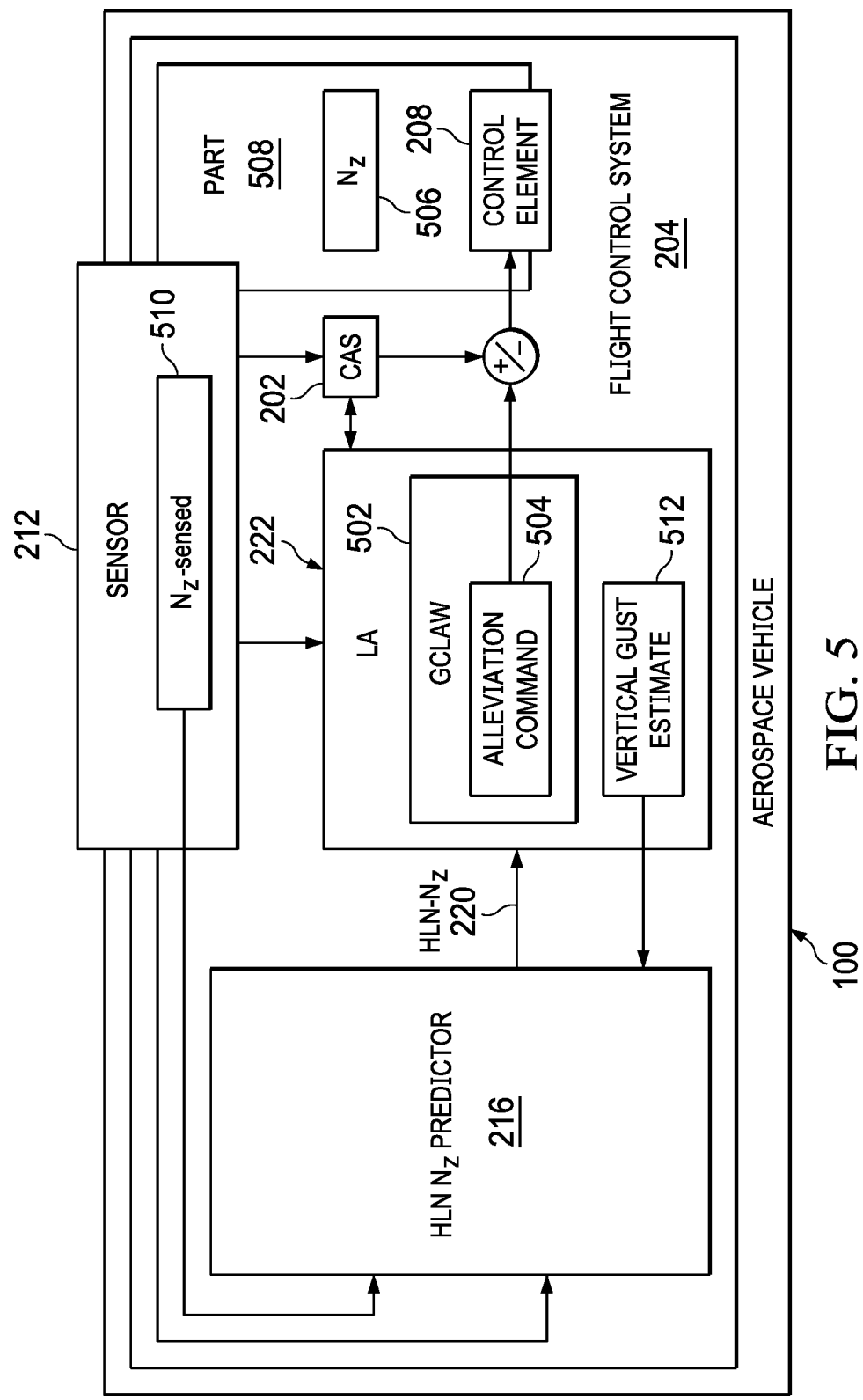
FIG. 5 is an illustration of a Ho-Ly-Niemiec (HLN) $N_z$ predictor added as an adaptor to an existing load alleviation sub-system to generate an accurate value of predicted normal acceleration to be used by control laws of a load alleviation sub-system in accordance with an illustrative example.

Looking now at FIG. 5, FIG. 5 is an illustration of a Ho-Ly-Niemiec (HLN) NZ Predictor added as an adaptor to an existing load alleviation sub-system to generate an accurate value of predicted normal acceleration to be used by control laws of a load alleviation sub-system in accordance with an illustrative example. Specifically, FIG. 5 shows a predicted value for normal acceleration (introduced in FIG. 2 as HLN-$N_z$ 220) at a future time provided to gust control laws (GCLAW) 502 of load alleviation sub-system (LA) 222 of flight control system 204 of aerospace vehicle 100 such that alleviation command 504 sent to control element 208 more effectively than currently existing load alleviation systems maintains a desired load $N_z$ 506 on part 508 of aerospace vehicle 100. Alleviation command 504 and control element 208 are shown in FIG. 5 as single items, but one of ordinary skill in the art understands that they may represent a number of alleviation commands and/or a number of elements. In the case of a wind gust impacting aerospace vehicle 100, the future time may be set at a time that the wind gust impacts part 508 of aerospace vehicle 100.

As used herein, "a number of" when used with reference to items means one or more items. Thus, a number of components is one or more components. In other words, "a number of" elements may be without limitation, any of 1, 2, 3, or more elements.

Control element 208 may represent any control on aerospace vehicle 100 that may affect $N_z$ 506 on part 508. Thus, in addition to a number of varied control surfaces on a number of parts of aerospace vehicle 100, without limitation an engine may be a control element, as well as flow suction or supplementation systems for surfaces on aerospace vehicle 100, as well as flexible shaping of part 508 of aerospace vehicle 100. Without limitation, control element 208 may be a surface that may affect lift on wing 302 of aerospace vehicle 100.

HLN $N_z$ Predictor 216 produces the technical benefit of providing HLN-$N_z$ 220, which results in LA 222 more effectively maintaining than currently existing load alleviation systems a desired load $N_z$ 506 on part 508, at least because HLN-$N_z$ 220, is more accurate than currently available predictions for a value for an $N_z$ that would occur at a specific time in the future on part 508 due to detrimental influence 214. Without limitation, part 508 may be a wing of wings 140, and detrimental influence 214 may be a wind gust, such as without limitation wind gust 228 shown in FIG. 2.

FIG. 5, shows that HLN-$N_z$ 220 produced in HLN $N_z$ Predictor 216 is fed into LA 222 for use by gust control laws GCLAW 502. GCLAW 502 may be a processor specially programmed with rules in an algorithm configured to produce alleviation command 504. $N_z$-sensed 510 represents a measurement of $N_z$ 506 on part 508 by sensor 212. $N_z$ 506 represents an $N_z$ component of a load on a part of aerospace vehicle 100. Hence, without limitation, $N_z$ 506 may be a component of lift along $Z_B$ axis 114 on wing 302 of aerospace vehicle 100 100.

Sensor 212 may be located on part 508. Sensor 212 may measure $N_z$ 506 of a load on part 508, and may be one of sensor 212 as shown in FIG. 2, such as without limitation wing sensor 146 as shown in FIG. 1. Without limitation, part 508 may be one of wings 140 shown in FIG. 1.

Sensor 212 is shown partly in and partly out of FCS 204 and aerospace vehicle 100 to indicate that sensor 212 may be within or outside of and in communication with FCS 204 and aerospace vehicle 100. Hence, without limitation sensor 212 may be on aerospace vehicle 100, on ground, in the air, on another vehicle, in space, or a combination thereof. As non-limiting examples, sensor may be a satellite-based tracking system in communication with aerospace vehicle 100, and/or an inertial referenced set of sensors located along a wingspan of aerospace vehicle 100.

Vertical gust estimate 512 is produced and provided as input to HLN $N_z$ Predictor 216 from a load alleviation sub-system 204 such as described in U.S. Pat. No. 9,639,089 which fully incorporates U.S. Pat. No. 8,774,987, represented in FIG. 5 of this application as LA 222 introduced in FIG. 2. Vertical gust estimate 512 may comprise a vertical component aligned with $Z_B$ axis 114 as shown in FIG. 1 of a gust sensed by aerospace vehicle 100.

In addition to vertical gust estimate 512, $N_z$ Predictor 216 receives $N_z$-sensed 510 from sensor 212. $N_z$ Predictor 216 also receives other sensed data for aerospace vehicle 100 from sensor 212.

Figure 6:
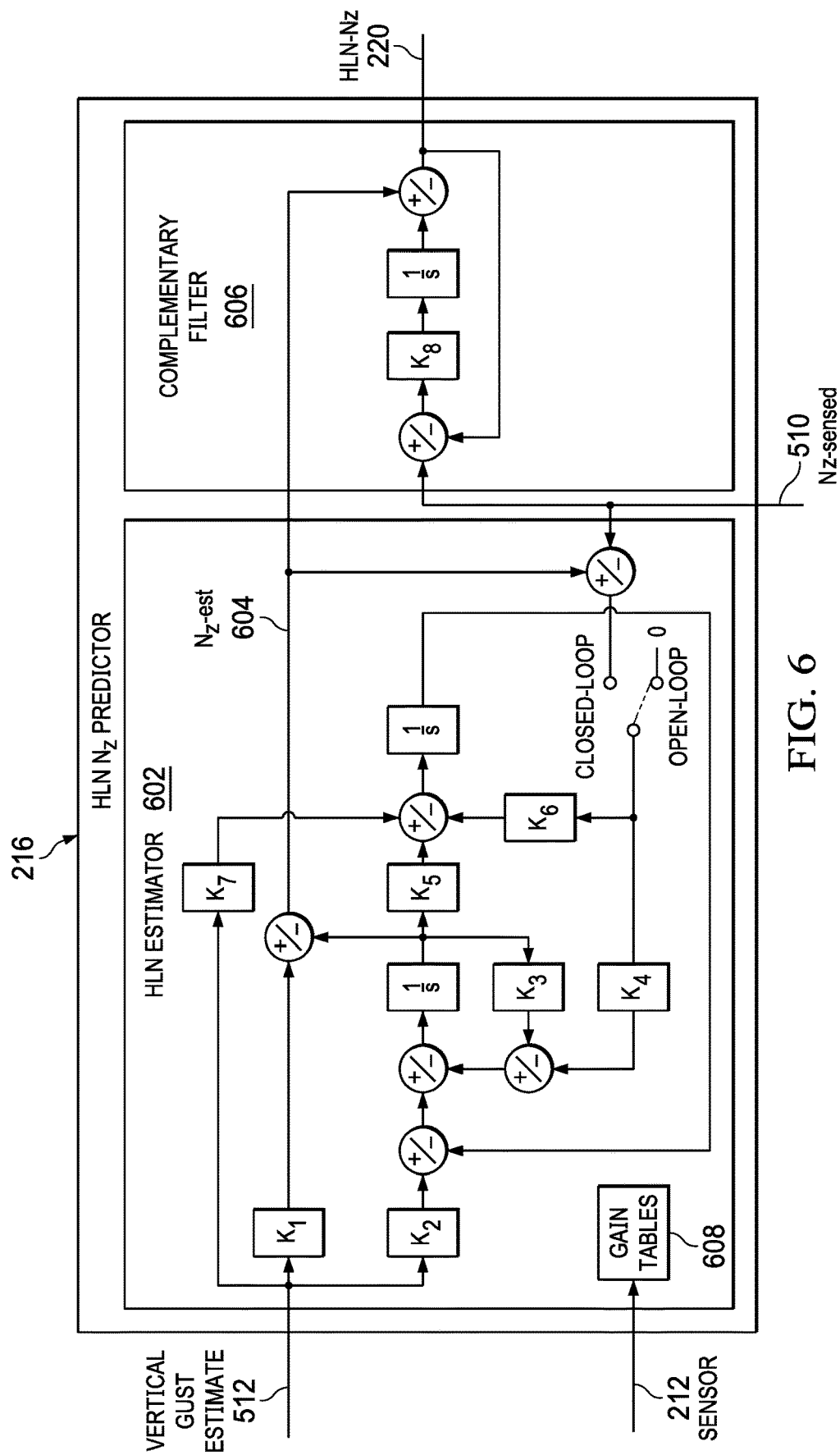
FIG. 6 is an illustration of an architecture for a Ho-Ly-Niemiec Estimator in accordance with an illustrated example.

Turning now to FIG. 6, FIG. 6 is an illustration of an architecture for a Ho-Ly-Niemiec (HLN)-$N_z$ predictor in accordance with an illustrated example. More specifically, an architecture for Ho-Ly-Niemiec (HLN)-$N_z$ predictor 216 shown in FIGS. 2 and 5 is presented in greater detail.

In FIG. 6, $N_z$-sensed 510 enters into closed-loop/open-loop switching within HLN estimator 602 within HLN-NZ predictor 216. Closed-loop/open-loop switching within HLN estimator 602 allows mixing $N_z$-sensed 510 with HLN estimator 602 derived $N_z$-est 604 processed through various gains in a closed-loop configuration.

Gain tables 608 reflect characteristics of aerospace vehicle 100 based upon inputs from sensor 212 that may include without limitation, a speed, an altitude, and a center of gravity for aerospace vehicle 100. Characteristics of aerospace vehicle 100 that may be reflected in gain tables 608 may include significant structural degrees of freedom including rigid body motions.

HLN estimator 602 may be a processor that includes an algorithm that includes rules that output $N_z$-est 604 based upon a performance and/or characteristics desired for aerospace vehicle 100. The algorithm may include a mathematical model. In the illustrative example of HLN estimator 602 in FIG. 6, gain tables 608 automatically adjust values of the gains: K1, K2, K3, K4, K5, K6 and K7 based upon rules that produce optimal values for the gains and HLN-$N_z$ 220 responsive to data received by HLN estimator 602 from sensor 212. Each gain, K1-K7, respectively may implement a scalar mathematical operation (output=input*K) that, in combination with the summing junctions and integrator blocks, implements an algorithm for the derivation of outputs $N_z$-sensed 510 and $N_z$-est 604.

In the illustrative example of FIG. 6, the gain K1 may adjust $N_z$-est 604 by applying an instant response to any change in vertical gust estimate 512 received by HLN estimator 602. Instant response to inputs provides technical benefits in the context of load alleviation where a rapid and/or refined response is desirable. Instant response provides for generation of refined and more accurate values of predicted HLN-$N_z$ 220. Refined and more accurate values of predicted HLN-$N_z$ 220 provides for a more stable and effective alleviation command 504.

Gains K2, K3, K5, and K7, as well as connected summing blocks and integrators are configured to implement, and in operation may implement, an algorithm that relates a change in $N_z$-est 604 to changes in inputs to HLN estimator 602. In closed-loop architecture, HLN estimator 602 may produce a value for $N_z$-est 604 from $N_z$-sensed 510 that is scaled based upon inputs: of vertical gust estimate 512 derived by load alleviation sub-system 222, a scale factor, and $N_z$-est 604 feedback, which is also generated within HLN estimator 602. A scale factor accounts for, at the time of the computation, a weight of aerospace vehicle 100 filtered based upon gain adjustments based upon lookups from gain tables 608. In other words, a scale factor applied in HLN estimator 602 accounts for a ratio of the current weight of aerospace vehicle 100 to a reference weight used by HLN estimator 602 to determine filter coefficients applied to deriving $N_z$-est 604. When HLN estimator 602 is switched to operate in closed-loop mode, gains K4 and K6 cause $N_z$-est 604 to gradually converge toward the value of $N_z$-sensed 510.

Hence, $N_z$-est 604 provides a novel linear filter model depicting a rate of change of acceleration along axis $Z_B$ 114 for aerospace vehicle 100 due to effects from wind gust 228 and/or (as explained further in FIG. 8 below) inputs from CAS 202 responsive to input 206 (as shown in FIG. 2) for a desired maneuver for aerospace vehicle 100. $N_z$-est 604 is also input into complementary filter 606.

When HLN estimator 602 is switched to operate in open-loop mode, $N_z$-sensed 510 and gains K4 and K6 have no effect on $N_z$-est 604. The selection of open-loop or closed-loop mode is at the discretion of a design engineer depending on design objectives for aerospace vehicle 100.

Alternatively, HLN estimator 602 may switch between the open-loop or closed-loop modes during operation. For example, when changes to vertical gust estimate 512 are large and rapid, $N_z$-sensed signal 510 may not provide accurate and/or timely data. Temporarily switching to open-loop mode prevents the not-yet-accurate and/or timely signal or $N_z$-sensed 510 from slowing output of $N_z$-est 604 that would be caused by delays in processing through gains K4 and K6. Once enough time has passed to expect a usable input from $N_z$-sensed 510, then HLN estimator 602 may return to closed-loop mode from open-loop mode operation.

Thus, an algorithm in HLN estimator 602 provides for switching between open-loop processing to obtain a rapid initial response, and switching to closed-loop processing to refine and improve the accuracy of $N_z$-est 604, and thus HLN-$N_z$ 220 as vertical gust estimate 512 approaches a steady state.

$N_z$-est 604 and $N_z$-sensed 510 are received into complementary filter 606. Complementary filter 606 may be a processor specially programmed to apply, and in operation apply, a novel algorithm that provides specially programmed rules for an iterative gain adjustment with filter K8 that modify $N_z$-est 604 and produce a novel and precise HLN-$N_z$ 220 output from complementary filter 606 and HLN-$N_z$ predictor 216. In other words, HLN-$N_z$ 220 represents a unique advanced load alleviation $N_z$ value scaled for an actual weight of the aircraft through application of filter K8. Complementary filter 606 sends HLN-$N_z$ 220 to GCLAW 502 in LA 222. Complementary filter 606 may represent a selection from any number of complementary filters, which may include without limitation, a first-order complementary filter and/or a second-order complementary filter (not shown).

Figure 7:
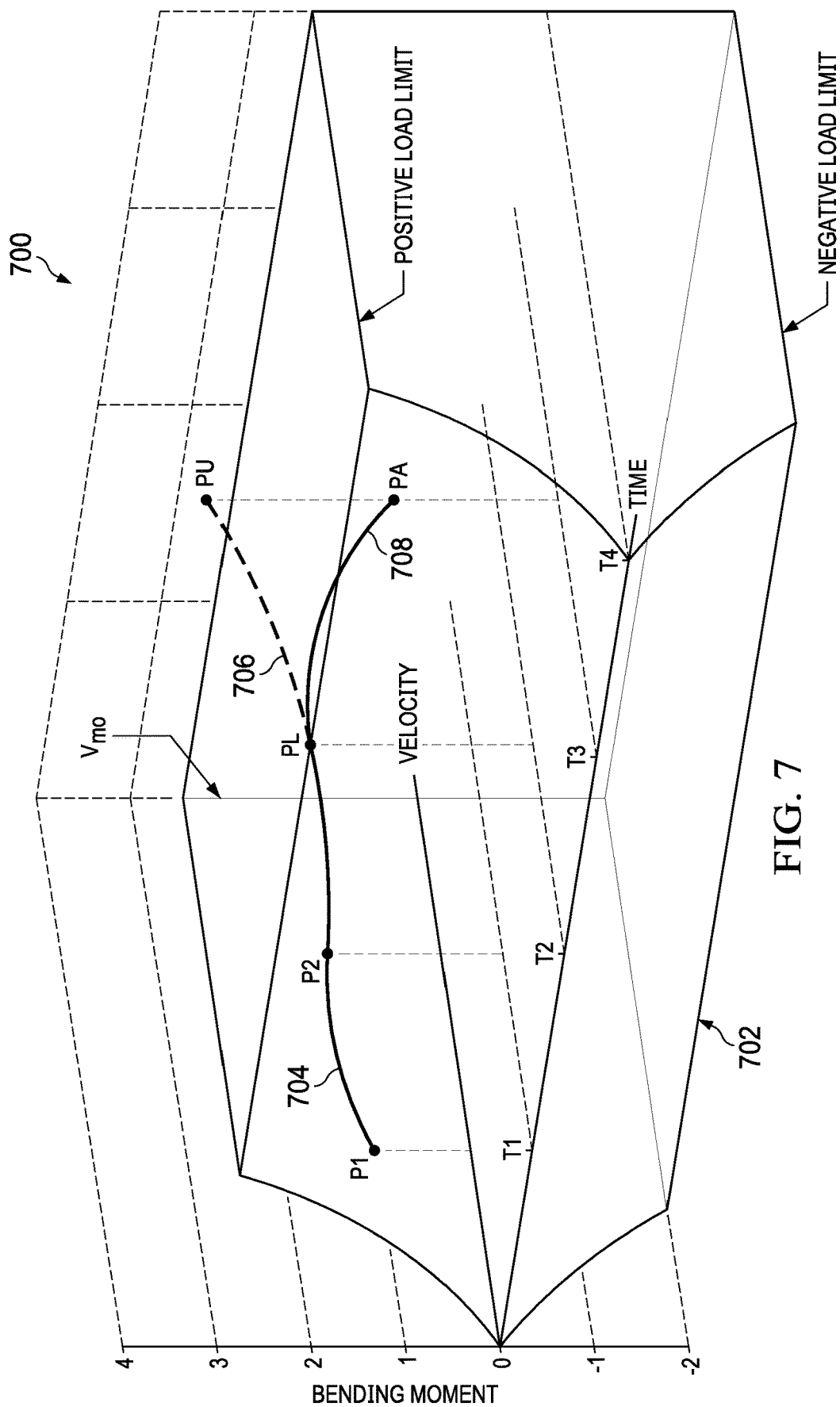
FIG. 7 is a chart showing a trend for an aerospace vehicle maneuver relative to a bending moment envelope for a part of an aerospace vehicle in accordance with an illustrative example.

Turning now to FIG. 7, FIG. 7 illustrates another technical benefit that may be provided from a precise HLN-NZ 220 value from HLN-NZ predictor 216. As will be further discussed below for FIG. 8, HLN estimator 602 algorithms may be applied to an input for a desired maneuver for aerospace vehicle 100 in a similar manner to an input from vertical gust estimate 512.

Thus, FIG. 7 is a chart showing a trend for an aerospace vehicle maneuver relative to a bending moment envelope for a part of an aerospace vehicle in accordance with an illustrative example. More specifically, chart 700 shows an example bending moment envelope 702 for an aerospace vehicle, such as without limitation aerospace vehicle 100 of FIG. 1. The left-side vertical axis provides relative values for a bending moment about an axis on a part 508. Without limitation, the bending moment illustrated may be about wing root 304 of wing 302 of aerospace vehicle 100. The units are marked by a non-limiting relative value that may be a multiple of some value of foot-pounds relative to a weight of aerospace vehicle 100. The horizontal axis provides relative values for velocity for aerospace vehicle 100. A third axis that extends orthogonally to both the vertical and horizontal axis provides relative passage of time as aerospace vehicle 100 performs a maneuver by aerospace vehicle 100 traced on chart 700.

Bending moment envelope 702 is defined by the confines of a positive (bending moment) load limit, a negative (bending moment) load limit, a maximum operating velocity, $V_{MO}$, and a null point of no velocity and no loading or bending moment. Within chart 700, plot 704 represents a maneuver for aerospace vehicle 100 from a state of aerospace vehicle 100 indicated by P1 at time T1 to a state indicated by P2 at T2. Plot 706 indicates a possible unalleviated continuation of the trend of the plot 704 maneuver by aerospace vehicle 100 above the positive load limit up to point PU until a future time T4. In other words, plot 706 indicates a predicted bending moment about an axis for a part of aerospace vehicle 100. HLN NZ predictor 216 provides the technical advantage of the predicted bending moment indicated by 706 being a precise prediction based upon using a precise value provided by HLN-$N_z$ 220.

As shown in the example of FIG. 7, plot 706 is seen to exceed the positive load limit of aerospace vehicle 100. Exceeding the positive load limit of aerospace vehicle 100 is a non-limiting example of undesired state 218 (described for FIG. 2) for aerospace vehicle 100. Hence, what is needed is an accurate prediction for a bending moment caused by an $N_z$ load at time T3 when aerospace vehicle 100 plot 704 will reach the positive load limit indicated by PL, and an alleviation command 504 just prior to T3 in time and of a magnitude to change the maneuver of aerospace vehicle 100 to proceed along a plot that remains within bending moment envelope 702 such as without limitation plot 708 that reaches point PA without exceeding the positive load limit.

Thus, regardless of consideration of any wind gust 228, a technical benefit may be realized by a machine like HLN $N_z$ predictor 216, which provides the technical benefit of a precise prediction for a value of $N_z$ at a time in the future, that provides for precise anticipation and thus control of bending moments on part 508 such as without limitation wing root 304. Hence, in a non-limiting example, if input 206 is received by FCS 204 to maneuver aerospace vehicle 100 to increase lift produced by wings 140, it may be desired to increase a value of lift toward a maximum limit with a minimum increase in bending moment at wing root 304, or toward an increase in a bending moment that remains below some desired level. The desired level may be the positive load limit shown in FIG. 7.

When, in a non-limiting example, a rolling pull-up maneuver may be desired for aerospace vehicle 100 that requires a greater increase in lift on one of wings 140 than on the other. at least because sensor 212 may represent a number of sensors located at different locations and distances along wingspan of wing 302, or sensors configured to derive an $N_z$ value at various locations along wing 302, HLN $N_z$ predictor 216 may be configured to predict precise values for a future $N_z$ 506 value, represented as HLN $N_z$ 220. The accuracy of the prediction represented by HLN $N_z$ 220 allows LA 222 to issue alleviation command 504 to produce a desired bending moment about wing root 304. HLN estimator 602 as detailed in FIG. 6 may receive and process an input for a desired maneuver for aerospace vehicle 100 in a similar manner as is shown for input of vertical gust estimate 512 in FIG. 6.

Figure 8:
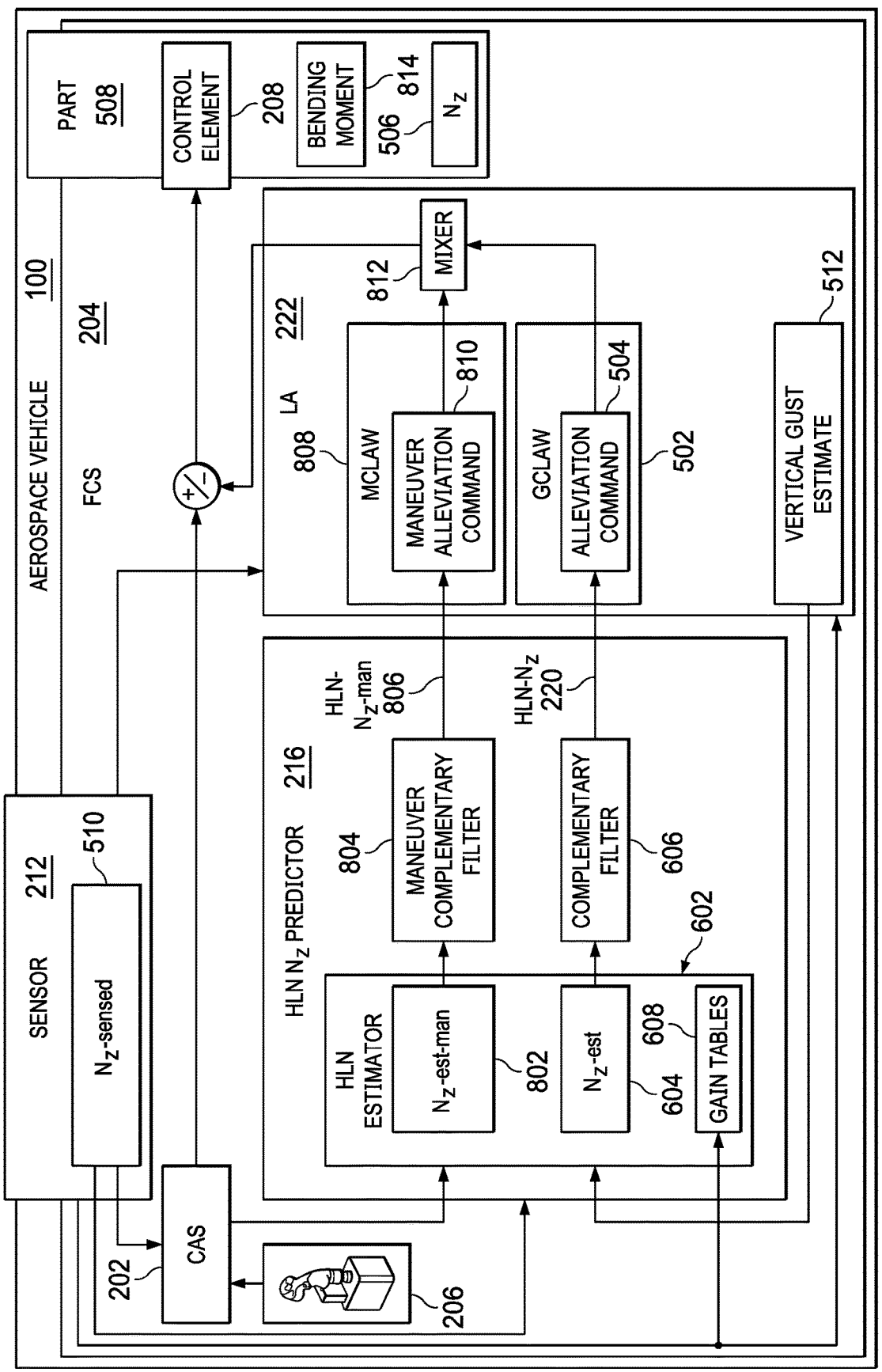
FIG. 8 is an illustration of a Ho-Ly-Niemiec (HLN) $N_z$ predictor added as an adaptor to an existing load alleviation sub-system to generate an accurate value of predicted normal acceleration to be used by control laws of a load alleviation sub-system in accordance with an illustrative example.

Thus, looking now to FIG. 8, FIG. 8 is an illustration of a Ho-Ly-Niemiec (HLN) $N_z$ predictor added as an adaptor to an existing load alleviation sub-system to generate an accurate value of a predicted normal acceleration to be used by control laws of a load alleviation sub-system in accordance with an illustrative example. In other words, Ho-Ly-Niemiec (HLN) $N_z$ predictor 216 may be incorporated into, or added onto as an adaptor for, a load alleviation sub-system in a newly designed aerospace vehicle. Further, HLN $N_z$ predictor 216 may be added as an adaptor onto an existing load alleviation sub-system 222 in an existing aerospace vehicle or design therefore.

FIG. 8 expands upon the architecture of HLN $N_z$ predictor 216 described in FIG. 6 to be responsive to the issues and needs represented by FIG. 7. In other words, FIG. 8 describes further architecture and capabilities of HLN $N_z$ predictor 216 to provide a technical solution to current load alleviation system limited capabilities in predicting and alleviating loads and resultant bending moments on parts of aerospace vehicle 100 due to maneuvering by aerospace vehicle 100.

More specifically, FIG. 8 indicates that input 206 may represent a desired maneuver for aerospace vehicle 100. Input 206 is received not only by CAS 202, but also by HLN estimator 602. HLN estimator 602 includes a specially programmed algorithm similar to the specially programmed algorithm described above for FIG. 6. The specially programmed algorithm similar to the one described above for FIG. 6, differs by instead of processing vertical gust estimate 512 as an input, receiving and processing in place of vertical gust estimate 512, input 206. The specially programmed algorithm may run parallel to and simultaneously with specially programmed algorithm described above for FIG. 6. In other words, HLN estimator 602 is configured to receive independently or simultaneously sensor 212 outputs (direct and processed) and in a novel technological improvement, break out the components and influences from exogenous influences such as without limitation, a wind gust, and from inputs for aircraft maneuvering for derivations of both HLN-$N_z$ 220 and HLN-$N_z$-man 806 as further described below.

As described above, input 206 may be a signal that represents a desired maneuver for aerospace vehicle 100. Input 206 may be first received by CAS 202. CAS 202 may process input 206. CAS 202 processing input 206 may include applying control law algorithms to input 206. One of the parallel algorithms in HLN estimator 602 processes input 206 received from CAS 202 to produce, in a similar manner as HLN-$N_z$-est 604 is produced from vertical gust estimate 512 as shown above in FIG. 6, $N_z$-est-man 802. $N_z$-est-man 802 represents an estimate for a value of $N_z$ 506 at a location on part 508 of aerospace vehicle 100 at a time in the future due to input 206.

$N_z$-est-man 802 is fed to maneuver complementary filter 804. In a manner similar to complementary filter 606 producing HLN-$N_z$ 220 as shown in FIG. 6, maneuver complementary filter 804 produces and outputs HLN-$N_z$-man 806. Similar to HLN-$N_z$ 220 that feeds GCLAW 502 with HLN-$N_z$ 220 based upon vertical gust estimate 512, maneuver complementary filter 804 derives HLN-$N_z$-man 806 based upon input 206 processed through CAS 202 and sends HLN-$N_z$-man 806 to maneuver control laws (MCLAW) 808 section of LA 222. MCLAW 808 generates maneuver alleviation command 810.

Hence, HLN-$N_z$ Predictor 216 functions as an adaptor that attaches to and provides a technological improvement to LA 222. Without HLN $N_z$ predictor 216, LA 222 suffers a technical problem of receiving only $N_z$-sensed 510 without discrete and precise values of HLN-$N_z$ 220 and HLN-$N_z$-man 806. $N_z$-sensed 510 may suffer a technical problem of having instrument errors, lags, instability, or being unable to predict a future state of $N_z$ 506. Therefore, without HLN $N_z$ predictor 216, LA 222 suffers the technical problem of ineffectively responding to, or actually generating detrimental influence 214 on aerospace vehicle 100. Without HLN $N_z$ predictor 216, LA 222 suffers the technical problem of contributing to or causing a dynamic instability for aerospace vehicle 100. Without HLN $N_z$ predictor 216, LA 222 suffers the technical problem of contributing to or causing and/or undesired load and/or bending on part 508 of aerospace vehicle 100.

Maneuver alleviation command 810 and alleviation command 504 are each sent to mixer 812 that combines them with a timing and magnitude that are combined with CAS 202 output to direct control element 208 to produce a desired value for $N_z$ 506.

One of ordinary skill in the art understands that FIG. 8 represents a system capable of deriving outputs from mixer 812 that may be generated continuously for each location along part 508 for which a value of $N_z$ 506 is sensed directly or indirectly and/or derived from data provided by sensor 212. Hence, with HLN-$N_z$ 220 and HLN-$N_z$-man 806, LA 222 may discretely compute an alleviation command 504 maneuver alleviation command 810 that manages $N_z$ 506 loads for each location along part 508 to a level that produces a minimal, or a desired, value of bending moment 814 about an axis for part 508. Without limitation bending moment 814 may be about wing root 304 for wing 302 of aerospace vehicle 100.

Therefore, HLN $N_z$ predictor 216 overcomes technical problems from undesired loads on, and bending moments, about particular locations on part 508 of aerospace vehicle 100 due to detrimental influence 214 and/or input 206 for a desired maneuver for aerospace vehicle 100. In other words, HLN $N_z$ predictor 216 incorporates specially programmed algorithms that include rules that provide an innovative technical solution that alleviates a load and or bending moment on an aerospace vehicle.

Thus, HLN-$N_z$ predictor 216 provides a novel machine that may be incorporated in a new design for an aerospace vehicle or be added as an adaptor that may be connected to an existing LA 222 to provide an algorithm that may provide an innovative technical solution that may prevent an undesired state for an aerospace vehicle 100 via a novel estimate of an $N_z$ load that enables distinct and accurately predicted HLN-$N_z$ 220 and HLN-$N_z$-man 806 values with a precision that is unavailable from currently existing load alleviation systems.

Hence, FIGS. 1-8 above describe at least a system, that includes: an illustrative example of a machine that may include: a sensor; a control element on the aerospace vehicle configured to change the load on a part of the aerospace vehicle; a predictor that may include a program code that may include an algorithm that may include rules configured to convert parameters from a state sensed, upwind from the part on the aerospace vehicle, into an estimated $N_z$ load on the part and a prediction, for a future time, of an $N_z$ load scaled for a weight of the aerospace vehicle. The state sensed upwind from the part may be a wind gust affecting the aerospace vehicle. The control element may include without limitation any surface and/or device that may control a load on a part of aerospace vehicle 100, including without limitation one of: an inboard spoiler, an outboard spoiler, an elevator, an aileron, or a combination thereof.

The machine of the illustrative example may also include the predictor configured to communicate the prediction of the $N_z$ load scaled for the weight of the aerospace vehicle to a load alleviation processor that may include an alleviation program code that may include an alleviation algorithm that may include rules configured to, based upon the prediction of the $N_z$ load scaled for the weight of the aerospace vehicle, generate and issue an alleviation command to the control element of the aerospace vehicle that may alleviate the load on the part. The predictor may also be configured to: decrease, compared to a load alleviation sub-system that includes at least one of a notch filter and a non-linear filter, a time required for generating and executing an alleviation command; and eliminate a susceptibility to instability from the load alleviation sub-system of the aerospace vehicle.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

The machine of the illustrative example may also include the predictor configured to receive an input for a desired maneuver for the aerospace vehicle and, based upon the input, derive a predicted $N_z$ load on a part of aerospace vehicle at a time in the future. The machine may also include a load alleviation sub-system configured to: based on upon the prediction of the $N_z$ load scaled for the weight of the aerospace vehicle, derive a predicted bending moment about a location on the aerospace vehicle; and derive and execute, before a time in the future, an alleviation command that alleviates the predicted bending moment.

In the illustrative examples, the hardware for the processor units may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices that may be used for processor units include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

The illustrations of FIGS. 1-8 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 9:
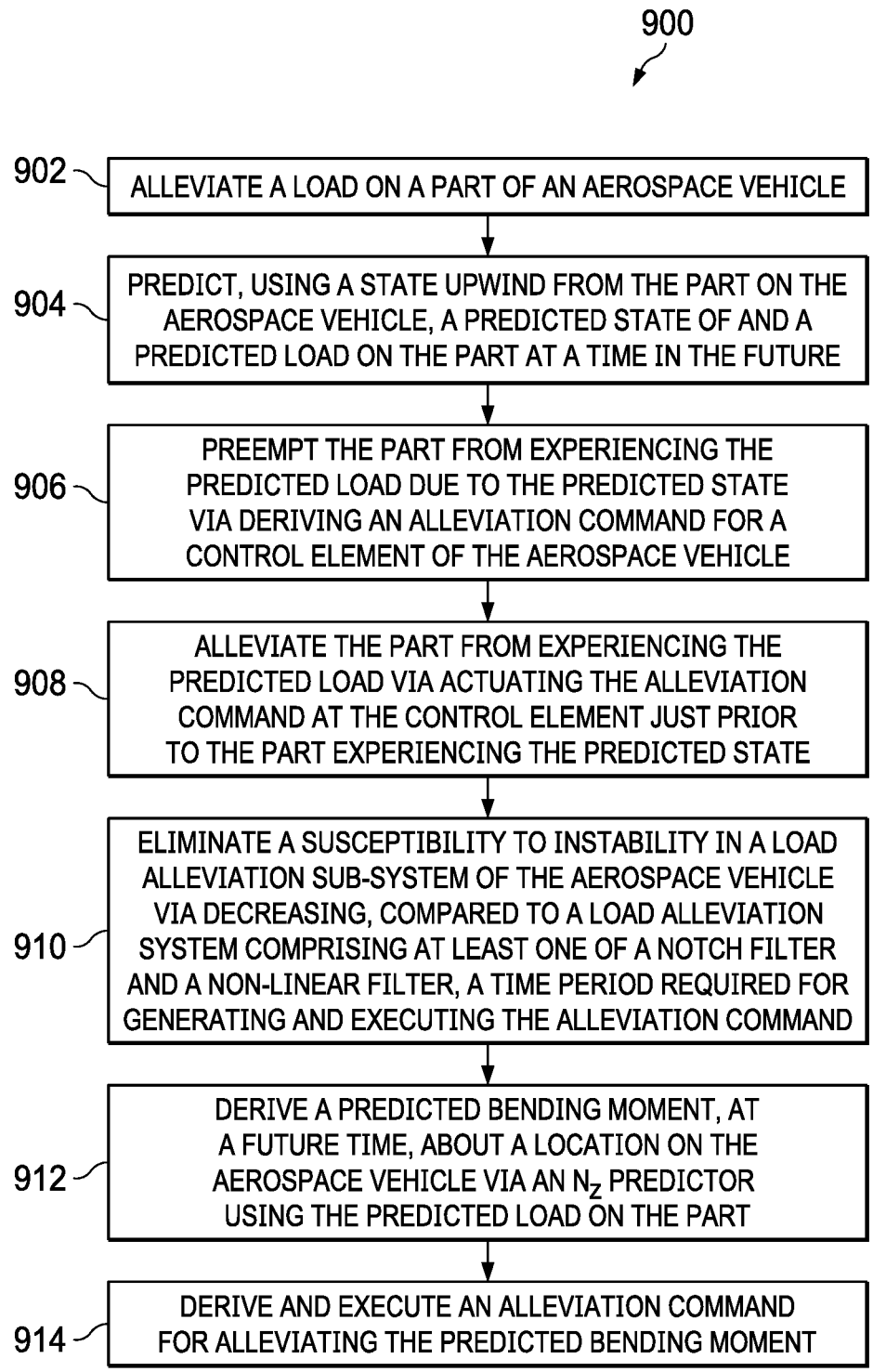
FIG. 9 is an illustration of a flowchart of a process for alleviating a load on a part of an aerospace vehicle in accordance with an illustrative example.

With reference now to FIG. 9, an illustration of a flowchart of a process for alleviating a load on a part of an aerospace vehicle is depicted in accordance with an illustrative example. More specifically, process 900 includes operations to: alleviate a load on a part of an aerospace vehicle (operation 902); and predict, using a state upwind from the part on the aerospace vehicle, a predicted state of and a predicted load on the part at a time in the future (operation 904). The state upwind from the part on the aerospace vehicle may include at least one of: an exogenous environmental influence affecting the aerospace vehicle, or a parameter sensed by a sensor located upwind from the part on the aerospace vehicle. The predicted state and the predicted load may be based upon a wind gust sensed upwind from the part. An estimate of a gust experienced upwind from the part may be used for predicting a value for an $N_z$ load on a wing of the aerospace vehicle when the gust reaches the wing.

One of ordinary skill in the art understands that some amount of time is required for an influence upwind of a part on an aerospace vehicle to reach the part on the aerospace vehicle. For a given flight control system on a particular aerospace vehicle, a minimum amount of time exists for the flight control to receive a sensed input, process a command, and issue and then execute the command. One of ordinary skill in the art understands that improvements that reduce that minimum amount of time may provide the benefit of more refined and effective commands to the flight control system.

Process 900 may also include operations that: preempt the part from experiencing the predicted load due to the predicted state via deriving an alleviation command for a control element of the aerospace vehicle (operation 906); alleviate the part from experiencing the predicted load via actuating the alleviation command at the control element just prior to the part experiencing the predicted state (operation 908); eliminate a susceptibility to instability in a load alleviation sub-system of the aerospace vehicle via decreasing, compared to a load alleviation system comprising at least one of a notch filter and a non-linear filter, a time period required for generating and executing the alleviation command (operation 910); and derive a predicted bending moment, at a future time, about a location on the aerospace vehicle via an $N_z$ predictor using the predicted load on the part (operation 912). Predicting a value for an $N_z$ load on a wing of the aerospace vehicle by an $N_z$ predictor may include receiving an input that may include a desired maneuver for the aerospace vehicle.

Process 900 may also include the $N_z$ predictor using the input for determining the predicted load for the part, and deriving, using the predicted load on the part, a predicted bending moment, at a future time, about a location on the aerospace vehicle. Additionally, process 900 may include an operation to derive and execute an alleviation command for alleviating the predicted bending moment (operation 914). One of ordinary skill in the art recognizes that although FIG. 9 describes the process for a part of an aerospace vehicle, that the process may be adapted to apply to a part not of an aerospace vehicle but present in a fluid flow, such as without limitation some other type vehicle.

Figure 10:
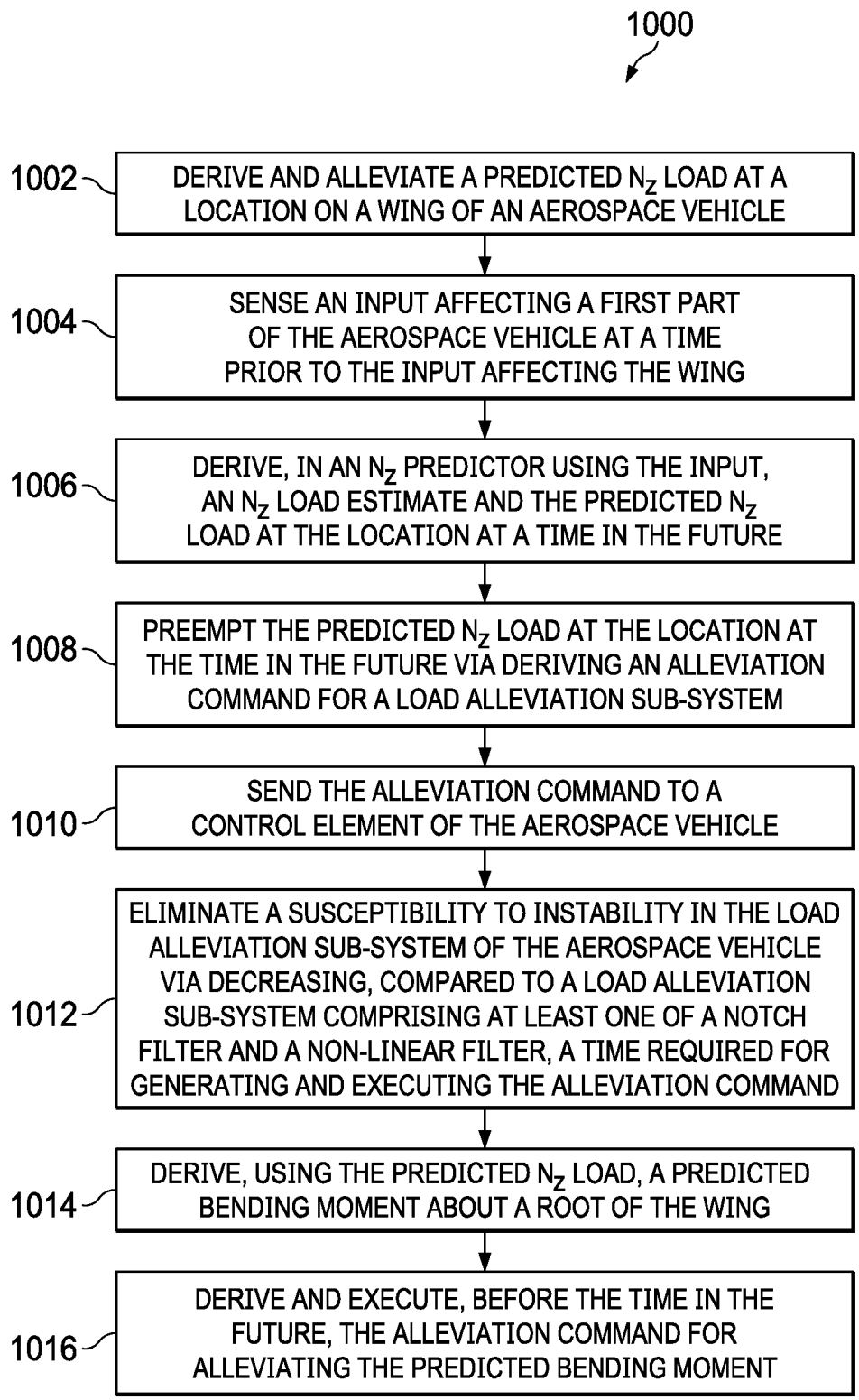
FIG. 10 is an illustration of a flowchart of a process for alleviating a load on a part of an aerospace vehicle in accordance with an illustrative example.

With reference now to FIG. 10, FIG. 10 is an illustration of a flowchart of a process for alleviating a load on a part of an aerospace vehicle in accordance with an illustrative example. More specifically, process 1000 may include innovative technical solutions including operations that: derive and alleviate a predicted NZ load at a location on a wing of an aerospace vehicle (operation 1002); and sense an input affecting a first part of the aerospace vehicle at a time prior to the input affecting the wing (operation 1004). The input may be a wind gust impacting the aerospace vehicle. The input may be a desired maneuver for the aerospace vehicle.

Process 1000 may also include operations that: derive, in an $N_z$ predictor using the input, an NZ load estimate and the predicted $N_z$ load at the location at a time in the future (operation 1006); preempt the predicted $N_z$ load at the location at the time in the future via deriving an alleviation command for a load alleviation sub-system (operation 1008); send the alleviation command to a control element of the aerospace vehicle (operation 1010); eliminate a susceptibility to instability in the load alleviation sub-system of the aerospace vehicle via decreasing, compared to a load alleviation sub-system comprising at least one of a notch filter and a non-linear filter, a time required for generating and executing the alleviation command (operation 1012); derive, using the predicted $N_z$ load, a predicted bending moment about a root of the wing (operation 1014); and derive and execute, before the time in the future, the alleviation command for alleviating the predicted bending moment (operation 1016).

One of ordinary skill in the art recognizes that although FIG. 10 describes the process for a wing of an aerospace vehicle, that the process may be adapted to apply to a part not of an aerospace vehicle but present in a fluid flow, such as without limitation a panel on some other type vehicle.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
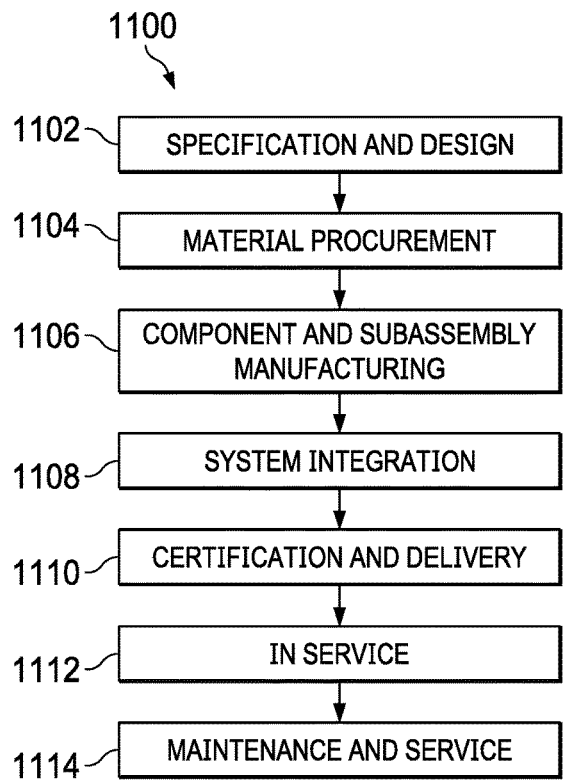
FIG. 11 is an illustration of a block diagram of an aircraft manufacturing and service method in accordance with an illustrative example.
Figure 12:
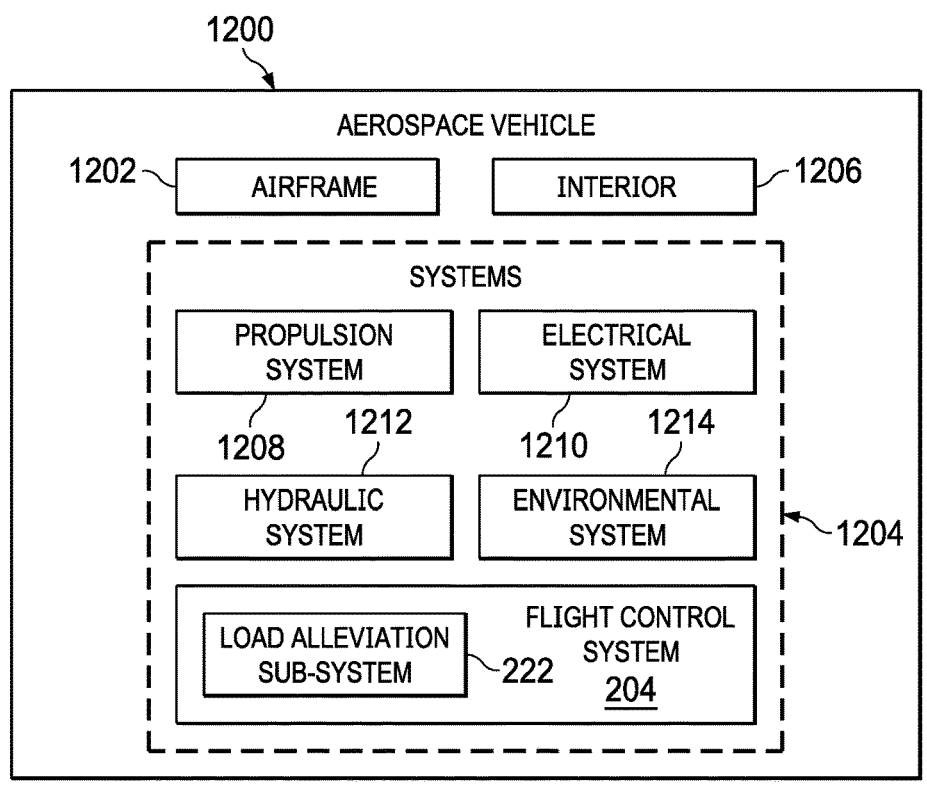
FIG. 12 is an illustration of a block diagram of an aircraft in accordance with an illustrative example.

Further, the illustrative examples of the disclosure may be described in the context of aerospace vehicle manufacturing and service method 1100 as shown in FIG. 11 and aerospace vehicle 1200 as shown in FIG. 12. Aerospace vehicle 1200 is representative of aerospace vehicle 100 of FIG. 1. Without limitation, aerospace vehicle 1200 may be an aircraft. Without limitation, aerospace vehicle 1200 may be a transport aircraft.

Turning first to FIG. 11, an illustration of a block diagram of an aerospace vehicle manufacturing and service method is depicted in accordance with an illustrative example. During pre-production, aerospace vehicle manufacturing and Service Method 1100 may include specification and design 1102 of aerospace vehicle 1200 in FIG. 12 and material procurement 1104.

During production, component and subassembly manufacturing 1106 and system integration 1108 of aerospace vehicle 1200 in FIG. 12 takes place. Thereafter, aerospace vehicle 1200 in FIG. 12 may go through certification and delivery 1110 in order to be placed in service 1112. While in service 1112 by a customer, aerospace vehicle 1200 in FIG. 12 is scheduled for routine maintenance and service 1114, which may include modification, reconfiguration, refurbishment, and other maintenance or service.

Each of the processes of aerospace vehicle manufacturing and Service Method 1100 may be performed or carried out by a system integrator, a third party, an operator, or some combination thereof. In these examples, the operator may be a customer. For the purposes of this description, a system integrator may include, without limitation, any number of aerospace vehicle manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aerospace vehicle is depicted in which an illustrative example may be implemented. In this example, aerospace vehicle 1200 is produced by aerospace vehicle manufacturing and Service Method 1100 in FIG. 12 and may include airframe 1202 with plurality of systems 1204 and interior 1206. Non-limiting examples of systems 1204 include one or more of propulsion system 1208, electrical system 1210, hydraulic system 1212, environmental system 1214, flight control system 204, and load alleviation sub-system 222. Load alleviation sub-system 222 may include a processor within flight control system 204. Any number of other systems and/or sub-systems may be included.

Although an aerospace example is shown, different illustrative examples may be applied to other industries involved with structures that experience a fluid flow and/or surface loading, such as without limitation the automotive and/or the marine industry, as well as fixed structures experiencing fluid flows, such as without limitation a bridge piling or an office building. Hence, the illustrative examples herein represent a machine and process that provides a technical improvement in alleviation of a load on a part in a fluid flow. In other words, without limitation, part 508 could be a part of an automobile, or a wall of a structure. Accordingly, without limitation the part in operation 902 of FIG. 9 may equally apply to a part other than of an aerospace vehicle.

The apparatuses and methods embodied herein may be employed during at least one of the stages of aerospace vehicle manufacturing and service method 1100 in FIG. 11. One or more apparatus examples, method examples, or a combination thereof may be utilized during production stages, such as component and subassembly manufacturing 1106 and system integration 1108 in FIG. 11. One or more apparatus examples, method examples, or a combination thereof may be utilized while aerospace vehicle 1200 is in service 1212, during maintenance and service 1114 in FIG. 12, or both. The use of a number of the different illustrative examples may substantially expedite the assembly of aerospace vehicle 1200, reduce the cost of aerospace vehicle 1200, or both expedite the assembly of aerospace vehicle 1200 and reduce the cost of aerospace vehicle 1200.

Thus, the illustrative examples show a process and machine that bBy preempting effects from detrimental influences, the aerospace vehicle becomes less susceptible to other problems like overstresses. The technical benefits provided by illustrative examples herein reduce an operator's workload at least because the operator does not need to anticipate, predict, and/or respond to an unexpected dynamic response of the aerospace vehicle.

At least because the HLN $N_z$ predictor provides a precise prediction for normal loads on a part of an aerospace vehicle, it can preempt and prevent or minimize an undesired state for the aerospace vehicle, such as without limitation an undesired wing load or wing bending moment. Thus, the illustrative examples described herein provide technical benefits that allow for a reduction in a required strength and/or weight of materials used to form a part for the aerospace vehicle. One of ordinary skill in the art understands that the technical benefits of the illustrative examples described herein provide further technical benefits of improved fuel efficiency and/or other operating performance for aerospace vehicle, as well as reduced time and cost for materials and manufacturing of the part.

Thus, the illustrative examples provide a method and apparatus for managing alleviation commands to control elements on an aerospace vehicle. Without limitation, one or more illustrative examples may provide an adaptor that may be connected to, incorporated with, and/or communicate with a load alleviation sub-system in communication with and/or a part of a control augmentation system. Without limitation, one or more illustrative examples may use a digital control augmentation system. Without limitation, one or more illustrative examples may use a digital fly-by-wire systems for the aerospace vehicle.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A process, the process comprising:
  receiving in an estimator generating an estimated load on a part of a vehicle:
    a gust estimate from a load alleviation sub-system; and
    values, comprising: a speed, and a center of gravity of the vehicle, from sensors on the vehicle;
  predicting, in an $N_z$ predictor using a load sensed on the part of the vehicle for iteratively adjusting the estimated load, a predicted state of and a predicted load on the part at a time in the future;
  using the predicted load for deriving an alleviation command for a control element of the vehicle for preempting the part from experiencing the predicted load;
  actuating the alleviation command at the control element just prior to the part experiencing the predicted state, thereby alleviating the part from experiencing the predicted load; and
  the estimator selecting between an open loop mode or a closed-loop mode for generating the estimated load of the part on the vehicle.

2. The process of claim 1, wherein the vehicle is an aerospace vehicle, and the estimator is further configured for receiving and processing the load sensed on the part of the vehicle for generating the estimated load on the part of the vehicle.

3. The process of claim 1, wherein the estimator is further configured for receiving and processing the load sensed on the part of the vehicle for generating the estimated load on the part of the vehicle.

4. The process of claim 1, further comprising the estimator comprising a gain setting responding to any change in the gust estimate and applying an instant adjustment to the estimated load output from the estimator.

5. The process of claim 1, further comprising the estimator operating in the open-loop mode and thereby:

decreasing, compared to the estimator operating in the closed-loop mode, a time period required for generating and executing the alleviation command; and eliminating a susceptibility to instability in a load alleviation sub-system of the vehicle.

6. The process of claim 1, further comprising performing the predicting by the $N_z$ predictor receiving an input comprising a desired maneuver for the vehicle.

7. The process of claim 6, further comprising the $N_z$ predictor using the input for determining the predicted load for the part, and deriving, using the predicted load on the part, a predicted bending moment, at a future time, about a location on the vehicle.

8. The process of claim 7, further comprising deriving and executing the alleviation command for alleviating the predicted bending moment.

9. A process, the process comprising:
sensing an input affecting a part of an aerospace vehicle at a time prior to the input affecting a wing of the aerospace vehicle;
receiving in an estimator in an $N_z$ predictor generating an $N_z$ load estimate at a location on the wing of the aerospace vehicle at a time in the future:
a gust estimate from a load alleviation sub-system; and
values, comprising: a speed, and a center of gravity of the aerospace vehicle, from sensors on the aerospace vehicle;
deriving, in the $N_z$ predictor using the input, the $N_z$ load estimate and a predicted $N_z$ load at the location on the wing at the time in the future;
preempting the predicted $N_z$ load at the location at the time in the future via, using the predicted $N_z$ load at the location on the wing at the time in the future and deriving an alleviation command in the load alleviation sub-system;
sending the alleviation command to a control element of the aerospace vehicle; and
the estimator selecting between an open-loop mode or a closed-loop mode for generating the estimated load of the part on the vehicle.

10. The process of claim 9, further comprising the estimator operating in the open-loop mode and thereby:
decreasing, compared to the estimator operating in the closed-loop mode, a time required for generating and executing the alleviation command; and
eliminating a susceptibility to instability in the load alleviation sub-system of the aerospace vehicle.

11. The process of claim 9, further comprising the input being a wind gust impacting the aerospace vehicle.

12. The process of claim 9, further comprising the input being a desired maneuver for the aerospace vehicle.

13. The process of claim 9, further comprising:
deriving, using the predicted $N_z$ load, a predicted bending moment about a root of the wing; and
deriving and executing, before the time in the future, the alleviation command for alleviating the predicted bending moment.

14. A machine configured to alleviate a load on an aerospace vehicle, wherein the machine comprises:
a sensor;
a control element on the aerospace vehicle configured to change the load on a part of the aerospace vehicle; and
a predictor that comprises:

an estimator, configured to generate an estimated load on the part of the aerospace vehicle based upon:
a selection between an open-loop mode or a closed-loop mode; and
a reception of:
a gust estimate from a load alleviation sub-system; and
values, comprising: a speed, and a center of gravity of the aerospace vehicle, from sensors on the aerospace vehicle;
a program code that comprises an algorithm that comprises rules configured to:
convert parameters from a state sensed upwind from the part on the aerospace vehicle into:
an estimated $N_z$ load on the part; and
a prediction, for a time in the future, of an $N_z$ load scaled for a weight of the aerospace vehicle; and
initiate an alleviation command that preempts the part on the aerospace vehicle from a load equal to the prediction of the $N_z$ load scaled for the weight of the aerospace vehicle at the time in the future.

15. The machine of claim 14, further comprising the predictor configured to communicate the prediction of the $N_z$ load scaled for the weight of the aerospace vehicle to a load alleviation processor that comprises an alleviation program code that comprises an alleviation algorithm that comprises rules configured to, based upon the prediction of the $N_z$ load scaled for the weight of the aerospace vehicle, generate and issue the alleviation command to the control element of the aerospace vehicle that alleviates the load on the part.

16. The machine of claim 14, further comprising:
the state sensed upwind from the part being a wind gust affecting the aerospace vehicle and
the estimator comprising a gain configured to, responsive to any change in the gust estimate, apply an instant adjustment to the estimated load.

17. The machine of claim 14, further comprising the control element comprising one of: an inboard spoiler, an outboard spoiler, an elevator, an aileron, or a combination thereof.

18. The machine of claim 14, further comprising the estimator comprising the open-loop mode configured to:
decrease, compared to operation in the closed-loop mode, a time required for generating and executing the alleviation command; and
eliminate a susceptibility to instability from the load alleviation sub-system of the aerospace vehicle.

19. The machine of claim 14, further comprising the predictor configured to:
receive an input for a desired maneuver for the aerospace vehicle; and
based upon the input, derive a predicted $N_z$ load on the part of the aerospace vehicle at the time in the future.

20. The machine of claim 14, further comprising the load alleviation sub-system configured to:
based on upon the prediction of the $N_z$ load scaled for the weight of the aerospace vehicle, derive a predicted bending moment about a location on the aerospace vehicle; and
derive and execute, before the time in the future, the alleviation command that alleviates the predicted bending moment.

* * * * *